United States Patent
Asada et al.

(10) Patent No.: US 7,674,043 B2
(45) Date of Patent: Mar. 9, 2010

(54) HYDRODYNAMIC BEARING ROTARY DEVICE

(75) Inventors: Takafumi Asada, Osaka (JP); Hiroaki Saito, Ehime (JP); Daisuke Itou, Osaka (JP); Hiroyuki Kiriyama, Ehime (JP); Tomoharu Takeda, Ehime (JP)

(73) Assignee: Panasonic Corporation, Osaka (JP)

( * ) Notice: Subject to any disclaimer, the term of this patent is extended or adjusted under 35 U.S.C. 154(b) by 508 days.

(21) Appl. No.: 11/723,316

(22) Filed: Mar. 19, 2007

(65) Prior Publication Data

US 2007/0217721 A1    Sep. 20, 2007

(30) Foreign Application Priority Data

Mar. 20, 2006    (JP) .............................. 2006-076327

(51) Int. Cl.
*F16C 32/06* (2006.01)
(52) U.S. Cl. ........................................ 384/107; 384/119
(58) Field of Classification Search ................ 384/100, 384/107, 119; 360/99.08, 98.07
See application file for complete search history.

(56) References Cited

U.S. PATENT DOCUMENTS

| | | | |
|---|---|---|---|
| 6,717,310 B2 * | 4/2004 | Yoshikawa et al. | 384/107 |
| 7,204,642 B2 * | 4/2007 | Kodama | 384/107 |
| 7,556,433 B2 * | 7/2009 | Kurimura et al. | 384/107 |
| 2006/0051001 A1 * | 3/2006 | Nishimura et al. | 384/100 |
| 2007/0280571 A1 | 12/2007 | Satoji et al. | |

FOREIGN PATENT DOCUMENTS

| | | |
|---|---|---|
| JP | 2000-113582 | 4/2000 |
| JP | 2005-45876 | 2/2005 |
| WO | 2005/117239 | 12/2005 |

OTHER PUBLICATIONS

Chinese Office Action (with English translation) issued Sep. 25, 2009 in corresponding Chinese Application No. 200710088565.

* cited by examiner

*Primary Examiner*—Thomas R Hannon
(74) *Attorney, Agent, or Firm*—Wenderoth, Lind & Ponack, L.L.P.

(57) ABSTRACT

An object of the present invention is to provide a hydrodynamic bearing type rotary device which can improve rotation performance, suppress a friction torque, and reduce power consumption of motor, and a recording and reproducing apparatus including the same. A shaft having a flange on one end and a hub on the other end is provided with a bearing of a sleeve so as to be rotatable. The sleeve includes a communication hole. A third gap between the hub and the sleeve end surface is a flow path, and is connected to the communication hole. Provided that a first gap between a thrust plate 4 and the flange 3 is S1, a second gap between the flange 3 and a lower end surface of the sleeve 1 is S2, and a third gap between the upper end surface of the sleeve 1 and the hub 7 is S3, widths of the gaps satisfy the relational expression, S3>(S1+S2).

22 Claims, 17 Drawing Sheets

HYDRODYNAMIC BEARING ROTARY DEVICE

TECHNICAL FIELD

The present invention relates to a hydrodynamic bearing type rotary device including a hydrodynamic bearing.

BACKGROUND ART

In recent years, recording and reproducing apparatus and the like using discs to be rotated experience an increase in a memory capacity and an increase in a transfer rate for data. Thus, bearings used for such recording and reproducing apparatus are required to have high performance and high reliability to constantly rotate a disc load with a high accuracy. Accordingly, hydrodynamic bearings suitable for high-speed rotation are used for such rotary devices.

The hydrodynamic bearing type rotary device has a lubricant such as oil between a shaft and a sleeve, and generates a pumping pressure by hydrodynamic generating grooves during rotation. Thus, the shaft rotates in a non-contact state with respect to the sleeve. Since no mechanical friction is generated, the hydrodynamic bearing type rotary device is suitable for high-speed rotation.

Hereinafter, an example of conventional hydrodynamic bearing type rotary devices will be described with reference to FIGS. 11 through 13.

As shown in FIG. 11, a conventional hydrodynamic bearing type rotary device includes a sleeve 21, a shaft 22, a stopper 23, a bottom plate 24, oil 25, a hub 27, a base plate 28, a rotor magnet 29, a stator 30, and a disc 31.

The shaft 22 is integrated with the hub 27 by press fitting, adhering, press-fit adhering, or the like. The shaft 22 is inserted into a bearing hole 21A of the sleeve 21 so as to be rotatable. The stopper 23 is fixed to the shaft 22 by a screw or press fitting, and is accommodated within a step portion 21C of the sleeve 21. On at least one of an inner peripheral surface of the sleeve 21 and an outer peripheral surface of the shaft 22, radial hydrodynamic generating grooves 21B are formed to form a radial bearing surface. On a surface of the sleeve 21 facing the hub 27 on the rotor side, thrust hydrodynamic generating grooves 21D having a spiral pattern as shown in FIG. 12 are formed to form a thrust bearing surface. The bottom plate 24 shown in FIG. 11 is fixed to the sleeve 21. On an outer peripheral surface of the sleeve 21, a tapered portion 21E is provided. A seal portion 32 is provided between the tapered portion 21E and a circular protrusion 27A of the hub 27. A lubricant such as the oil 25 is sealed in the bearing cavity, and a gas-liquid boundary surface of the lubricant is formed near the seal portion 32. The sleeve 21 is processed so as to have a vent hole 21F which helps discharging air.

To the base plate 28, the sleeve 21 is fixed. The stator 30 is also fixed to the base plate 28 so as to oppose the rotor magnet 29. Magnetic centers of the rotor magnet 29 and the stator 30 in an axial direction are largely shifted, and thus, the rotor magnet can generate an attraction force in a direction indicated by arrow M in the figure. To the hub 27, the rotor magnet 29 and the disc 31 are fixed.

Operations of the conventional hydrodynamic bearing type rotary device having the above-described structure are as follow. In the conventional hydrodynamic bearing type rotary device shown in FIG. 11, when an electric current is supplied to the stator 30, a rotary magnetic field is generated, and a rotary force is applied to the rotor magnet 29. Thus, the rotor magnet 29 starts to rotate with the hub 27, the shaft 22, the stopper 23, and the disc 31. When these members rotate, the radial hydrodynamic generating grooves 21B gather the oil 25 filled in the radial gap, and a pumping pressure is generated between the shaft 22 and the sleeve 21. The thrust hydrodynamic generating grooves 21D gather the oil 25, and a pumping pressure is generated between the hub 27 and the sleeve 21. The shaft 22 and hub 27 float in a direction opposing the attraction force of the rotor magnet 29 which is indicated by arrow M in the figure, and starts to rotate in a non-contact state.

If there is air in the bearing cavity, the air probably passes through the vent hole 21F and is discharged from the gas-liquid boundary surface of the seal portion 32. The term "probably" is used because the air entered in bearing may go to the gas-liquid boundary surface or may go back to the bearing, and not necessarily discharged to the gas-liquid boundary surface.

As described above, the shaft 22 can rotate in a non-contact state with respect to the sleeve 21. With a magnetic head or an optical head (not shown), data can be recorded/reproduced to/from a rotating disc 31.

DISCLOSURE OF THE INVENTION

Problems to be Solved by the Invention

However, in the above conventional hydrodynamic bearing type rotary device, only the thrust hydrodynamic generating grooves 21D serve as the thrust bearing portion. Thus, the level to which the hydrodynamic bearing floats (thickness of an oil film) is determined depending upon the attraction force (M) of the rotor magnet 29. Thus, in such a single-sided thrust hydrodynamic bearing, the floating height is uniquely determined as the attraction force (M) is determined. As a result, an angular stiffness against a tilting moment due to disturbance vibration to tilt the rotor is also uniquely determined. For increasing the angular stiffness, the attraction force has to be increased and the floating height has to be suppressed to increase a hydrodynamic pressure. Alternatively, the thrust hydrodynamic generating grooves 21D have to be designed to have a large outer diameter so that a radial position where the maximum pressure is generated in the thrust bearing becomes closer to the outer circumference. This causes a friction torque of the thrust bearing portion to increase to the same level as that of the radial bearing portion or higher as shown in FIG. 13. As a result, a rotational friction loss increases and a power consumption of the motor increases. FIG. 13 shows friction torques of the hydrodynamic bearing at different temperatures. The friction torque is generated in both the radial bearing portion and the thrust bearing portion.

On the other hand, for increasing the rotor magnet and the attraction force (M), relative height difference between the rotor magnet and the stator has to be increased. However, if relative difference is increased, cogging vibration becomes large, and disturbance vibration against the rotor increases. This causes a rotation accuracy to significantly deteriorate.

An object of the present invention is to provide a hydrodynamic bearing type rotary device which can suppress a friction torque and reduce power consumption of a motor while improving rotation performance.

Means for Solving the Problems

A hydrodynamic bearing type rotary device according to one aspect of the present invention includes a sleeve, a shaft, a flange, a hub, and a thrust plate. The sleeve has a bearing hole. The shaft is inserted into the bearing hole of the sleeve so as to be relatively rotatable. The flange forming a substantially disc-like shape is integrally attached near one end of the shaft. The hub is attached to the other end of the shaft and has an additional member receiving surface on which the additional member to the motor can be loaded. The thrust plate is placed so as to oppose the flange. A first gap (S1) between surfaces of the flange and the thrust plate which oppose one another in an axial direction, a second gap (S2) between surfaces of the flange and the sleeve which oppose one another in the axial direction, and a third gap (S3) between a surface of the hub and the other end surface of the sleeve which oppose one another in the axial direction are respectively formed. A communication path which connects the first gap (S1) or the second gap (S2) and the third gap (S3) and forms a circulation passage to which a lubricant is injected together with the first gap (S1) or the second gap (S2) and the third gap (S3) is further provided. Widths of the first through third gaps (S1 through S3) satisfy the following relational expression (1):

$$S3 > (S1 + S2) \tag{1}$$

With such a structure, the third gap (S3) can be secured irrespective of the position where the flange rotates in the gap. Thus, a certain amount of the lubricant can always be kept in the third gap S3. Since the flange corresponding to the thrust bearing portions has a gap narrower than the third gap S3 at both surfaces, a capillary force there becomes stronger than that at the third gap S3, and thus, the lubricant is always filled. As a result, the lubricant can always be kept on the both surfaces of the flange, and a sufficient angular stiffness can be obtained even with a small outer diameter of the thrust bearing portions. Thus, the friction torque at the thrust bearing portions can be reduced. In this way, a hydrodynamic bearing type rotary device with high rotation performance and suppressed power consumption of the motor can be achieved.

A hydrodynamic bearing type rotary device according to another aspect of the present invention includes a sleeve having a bearing hole, a shaft which is inserted into the bearing hole of the sleeve so as to be rotatable, a flange having a circular plate shape which is integrally attached to near one end of the shaft, a hub which is attached to the other end of the shaft and has a disc receiving surface on which a disc can be loaded, a thrust plate which is attached to one end side of the flange in the axial direction, a third gap (S3) between a surface of the hub and one end surface of the sleeve, a radial bearing formed of a fourth gap (G1) with radial hydrodynamic generating grooves formed on at least one of an outer peripheral surface of the shaft and an inner peripheral surface of the sleeve, a second gap (S2) between surfaces of the flange and the sleeve which oppose one another in the axial direction, and a first gap (S1) between surfaces of the flange and the thrust plate which oppose one another in an axial direction, in which first thrust hydrodynamic generating grooves are formed on at least one of the thrust plate and the flange surface which opposes the thrust plate, a communication path is provided to connect the second gap and the third gap, a fifth gap is provided between an outer peripheral surface of the sleeve on the side of the hub and an inner peripheral surface of the hub, which has a diameter slightly larger than that of the outer peripheral surface, the communication path, the second gap, the fourth gap, and the third gap communicate to form a circulation passage, a lubricant is injected into the circulation passage, a lubricant is also injected into the first gap and the fifth gap, and widths of the first through third gaps are set to satisfy the relation, S3>(S1+S2).

By providing a space between the hub and the sleeve as a circulation fluid path for the lubricant, a rotation friction torque can be reduced sufficiently while the high angular stiffness is being maintained. As a result, a hydrodynamic bearing type rotary device which has high bearing performance with reduced power consumption of the motor can be achieved.

A hydrodynamic bearing type rotary device according to yet another aspect of the present invention includes a sleeve, a shaft, a flange, a hub, and a thrust plate. The sleeve has a bearing hole. The shaft is inserted into the bearing hole of the sleeve so as to be relatively rotatable. The flange forming a substantially disc-like shape is integrally attached near one end of the shaft. The hub is attached to the other end of the shaft and has an additional member (such as a disc) receiving surface on which the additional member to the motor can be loaded. The thrust plate is placed so as to oppose the flange. A third gap (S3) is formed between a surface of the hub and other end surface of the sleeve which oppose one another. Further, a fourth gap (G1) with radial hydrodynamic generating grooves formed on at least one of an outer peripheral surface of the shaft and an inner peripheral surface of the sleeve, and a fifth gap between an outer peripheral surface near the side of the other end surface of the sleeve and an inner peripheral surface of the hub, which has a diameter slightly larger than that of the outer peripheral surface, are respectively provided. A maximum gap G2 of the fifth gap is formed to have a width which satisfies the following relational expression (2):

$$G2 > S3 > G1 \tag{2}$$

The lubricant tends to move toward the smaller gap due to the surface tension. Thus, the lubricant is moved from the fifth gap (G2) toward the third gap (S3), and then, from the third gap (S3) to the radial hydrodynamic bearing portion (G1) by the oil sealing effect. Thus, it is ensured that the lubricant is kept in the bearing cavity.

In the above hydrodynamic bearing type rotary device, thrust hydrodynamic generating grooves are formed on at least one of the thrust plate and the flange surface which opposes the thrust plate, and, as necessary, thrust hydrodynamic generating grooves are formed on at least one of the flange and an end surface of the sleeve which opposes the flange.

With such a structure, thrust bearing portions are formed respectively between the thrust plate and the flange, and between the flange and the sleeve. In this way, the angular stiffness of the thrust bearing portion can be increased and the rotation friction torque can be sufficiently reduced to suppress the rotational resistance.

In the above hydrodynamic bearing type rotary device, on the outer peripheral surface of the sleeve which defines the fifth gap, a surface is formed such that the gap becomes narrower toward the third gap.

The lubricant tends to move toward the smaller gap due to the surface tension. The oil sealing effect is obtained, and the lubricant moves in the fifth gap toward the third gap having the narrower width. As a result, it is ensured that the lubricant is kept in the bearing cavity.

In the above hydrodynamic bearing type rotary device, the hub includes a rotor magnet, a motor stator is attached to a base plate to which the sleeve is fixed, and magnetic centers in the axial direction and in the radial direction of the rotor magnet and the motor stator are substantially aligned.

With such a structure, rotation vibration or fluctuations in a rotation speed due to a variance in magnetization of the rotor magnet can be reduced compared to those in conventional hydrodynamic bearing type rotary device having magnetic centers of the rotor magnet and the motor stator being shifted.

In the above hydrodynamic bearing type rotary device, the sleeve includes a sintered sleeve formed of metal sintered material, and a sleeve collar surrounding the outer circumference of the sintered sleeve, and the communication path is provided between the sintered sleeve and the sleeve collar so as to connect the first or the second gap and the third gap.

Since the sleeve is formed of two components, the sintered sleeve and the sleeve collar, a fundamental form of the sintered sleeve can be made closer to a simple cylindrical shape.

As a result, accuracy of sintering the sintered sleeve can be improved, and the yield is also improved. Further, a structure of a die for sintering can be simplified so the cost for the die can be suppressed and die accuracy can be improved. Thus, bearings suitable for mass production can be provided.

In the hydrodynamic bearing type rotary device, the sintered sleeve includes iron or copper as a main component at a sintered density of 90% or higher, and a surface thereof is provided with a triiron tetroxide film or treated with electroless nickel plating.

With such a structure, pores on the surface of the sintered material are sealed, and hydrodynamic pressures can be prevented from deterioration, which may be caused by penetration of the lubricant from the bearing surface into the base material of the sintered sleeve. Thus, bearings suitable for mass production which have high bearing stiffness can be provided. The density of the sintered metal material may refer to either an average density of the sintered components (volume density) or a density of a surface (area density). However, as used herein, density refers to the volume density obtained by dividing the mass after degreasing by the volume, as defined in JIS Z2501.

Effects of the Invention

According to the present invention, hydrodynamic bearing type rotary device which can reduce a rotation friction torque in a bearing and reduce power consumption of a motor or the like, and an information apparatus such as recording and reproducing apparatus which includes the same can be provided.

BEST MODE FOR CARRYING OUT THE INVENTION

Figure 1A:
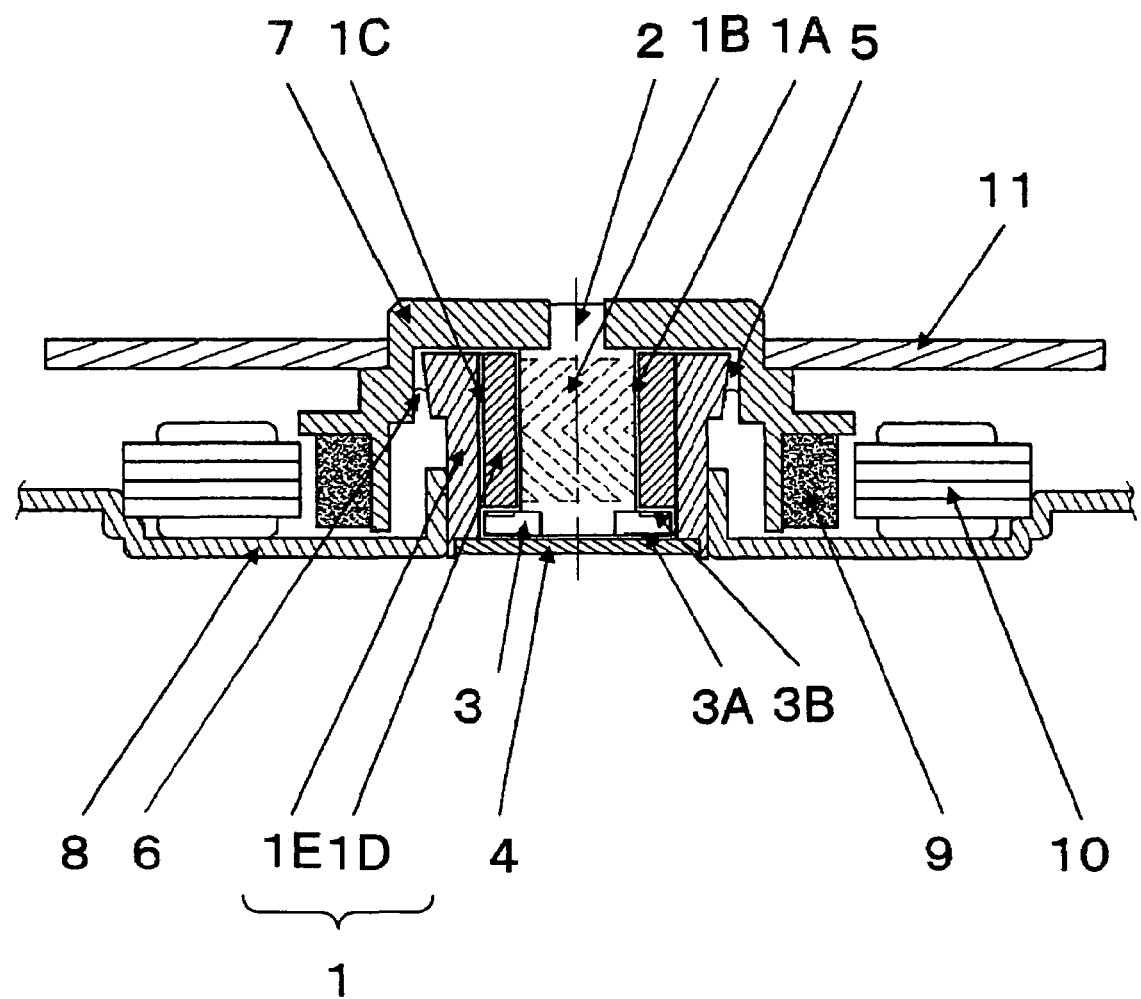
FIG. 1A is a cross-sectional view of a hydrodynamic bearing type rotary device according to one embodiment of the present invention.

Hereinafter, an embodiment which specifically shows the best mode for carrying out the invention will be described with reference to FIGS. 1A through 10.

The terms "upper" and "lower" as used herein refer to one direction and the other direction along the axial direction of a shaft 2. These terms are used with an intention to help understanding the figures, and the present invention is not limited by these terms.

As shown in FIGS. 1A through 4B, the hydrodynamic bearing type rotary device according to the present embodiment includes a sleeve 1, a shaft 2, a flange 3, a thrust plate 4, a lubricant 5 such as oil, high-fluidity grease, ionic liquids or the like, a hub 7, a base plate 8, a rotor magnet 9, a stator 10, and the like.

Figure 1B:
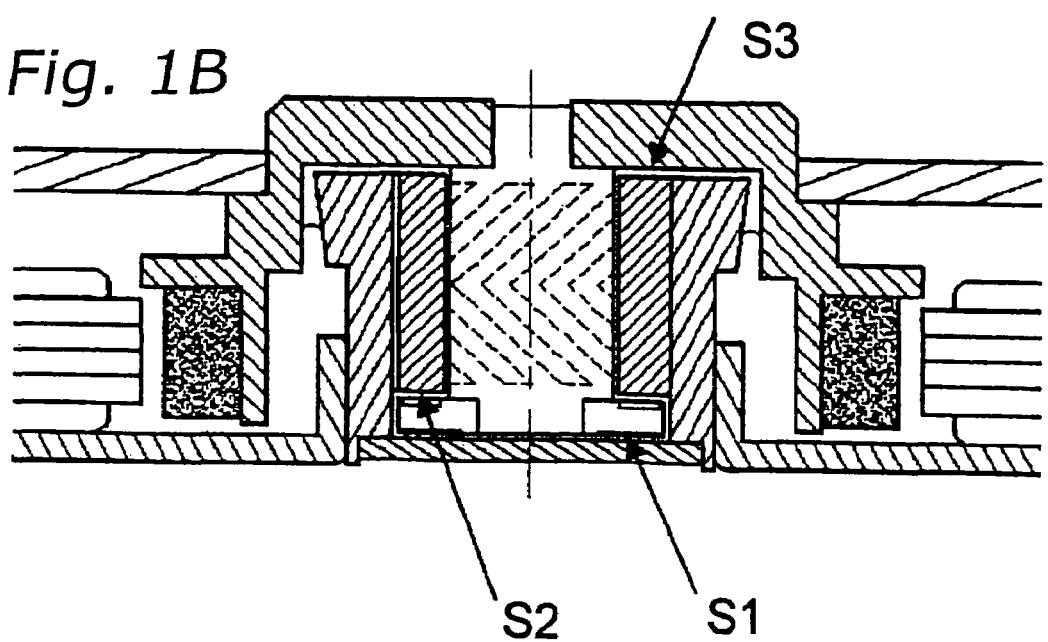
FIG. 1B is an enlarged view thereof.

The sleeve 1 includes an inner sleeve (sintered sleeve) 1D and an outer sleeve (sleeve cover) 1E. In FIGS. 1A and 1B, the sleeve 1 is illustrated to have a separate inner sleeve 1D and an outer sleeve 1E. However, sleeves including integrally formed inner sleeve and outer sleeve may also be used.

A lower end of the shaft 2 is integrated with the flange 3 by weld processing, compression molding, or the like. The shaft 2 is inserted into a bearing hole 1A of the sleeve 1 so as to be rotatable, and forms a radial bearing surface which has a gap G1. The shaft 2 and the flange 3 may be integrally processed by cutting.

The flange 3 is accommodated below the sleeve 1. On at least one of an outer peripheral surface of the shaft 2 and an inner peripheral surface of the sleeve 1, radial hydrodynamic generating grooves 1B are formed. On a surface of the flange 3 which faces the thrust plate 4, first thrust hydrodynamic generating grooves 3A are formed. On a surface of the flange 3 which faces the sleeve 1, second thrust hydrodynamic generating grooves 3B are formed. In the sleeve 1, a communication hole 1C is formed as a communication path extending substantially parallel to the bearing hole 1A.

The thrust plate 4 is fixed to the sleeve 1 by a method such as press fitting adhering, press-fit adhering caulking, laser-welding, or the like. On an upper end of the shaft 2, the hub 7 having a shape substantially like a cup is fixed by a method such as press fitting, adhering, press-fit adhering, caulking, laser-welding, or the like. The hub 7 has a disc receiving surface (additional member receiving surface) to which a disc can be loaded. Between an outer peripheral surface of the sleeve 1 near the upper end and an inner peripheral surface of the hub of a substantially cup-like shape which has a slightly larger diameter than that of the outer peripheral surface, a seal portion 6 is provided. The seal portion 6 is a fifth gap having a maximum gap G2. A first gap between the thrust plate 4 and the flange 3, a second gap between the flange 3 and a lower end surface of the sleeve 1, a fourth gap of the bearing hole 1A of the sleeve 1, a third gap between an upper end surface of the sleeve 1 and the hub 7, the communication hole 1C, and the seal portion 6 together form a bearing gap having a shape like a bag. The entire bearing gap is filled with the lubricant 5 such as oil, high-fluidity grease, ionic liquids or the like. The second gap, the fourth gap, which is the radial bearing, and the third gap are connected by the communication hole 1C and they together form a loop through which the lubricant 5 circulates.

To the base plate 8, the sleeve 1 is fixed by adhering or the like. The stator 10 is also fixed to the base plate 8 by adhering or the like so as to oppose the rotor magnet 9. On the other hand, to the hub 7, the shaft 2 is fixed by press fitting, adhering, press-fit adhering, laser welding or the like. Also, the rotor magnet 9 is fixed to the hub 7 by adhering or the like, and a disc 11 is fixed by screwing or shrinkage fitting a cramp member (not shown).

Operations of the hydrodynamic bearing type rotary device of the present embodiment which has the above-described structure are as follow.

As shown in FIGS. 1A through 4B in the hydrodynamic bearing type rotary device of the present embodiment, when an electric current is supplied to the stator 10, a rotary magnetic field is generated and a rotary force is applied to the rotor magnet 9. This causes the rotor magnet 9 to start rotating with the hub 7, the shaft 2, the flange 3, and the disc 11. As these members rotate, hydrodynamic generating grooves 1B, 3A, and 3B gather the oil, i.e., a lubricant 5 filled in the bearing gap. Accordingly, pumping pressures are generated in the fourth gap which forms the radial bearing between the shaft 2 and the sleeve 1, the first gap between the thrust plate 4 and the flange 3, and the second gap between the flange 3 and the sleeve 1. Thus, the shaft 2 can be rotated in a non-contact state with respect to the sleeve 1 and the thrust plate 4. With a magnet head or an optical head (not shown), data can be recorded/reproduced to/from a rotating disc 11.

Figure 2:
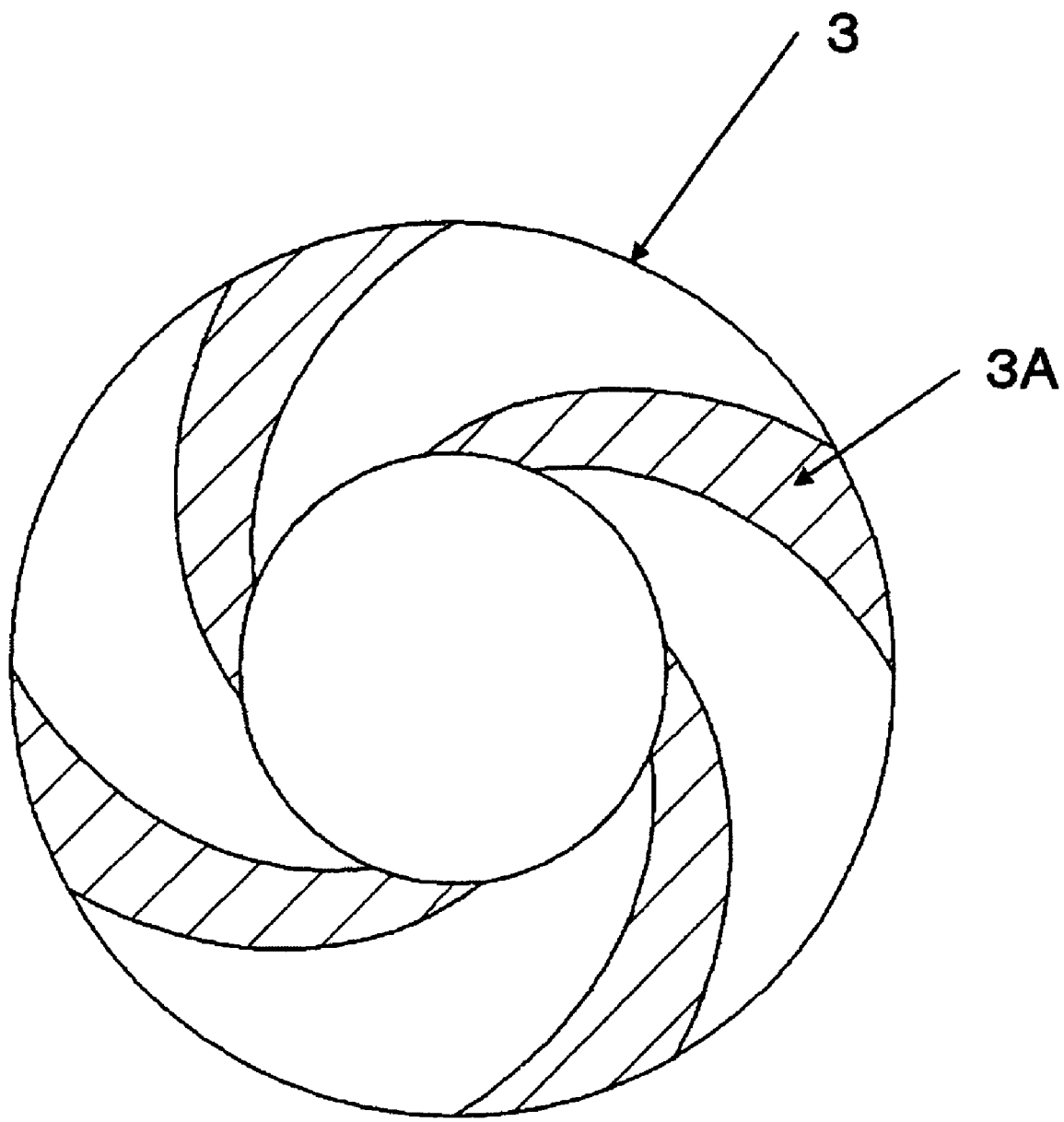
FIG. 2 is a detailed diagram showing thrust hydrodynamic generating grooves of the hydrodynamic bearing type rotary device.
Figure 3:
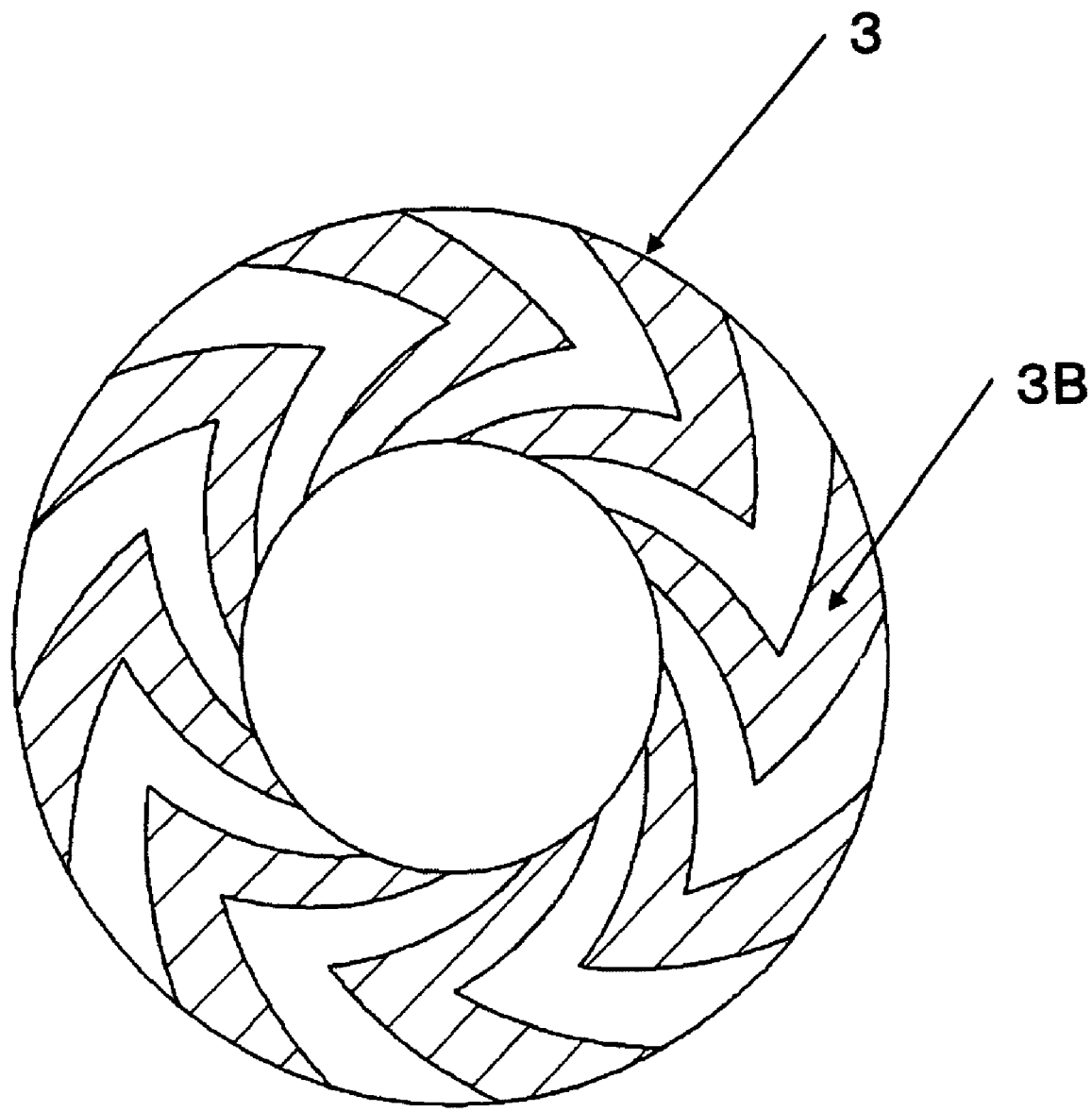
FIG. 3 is a detailed diagram showing thrust hydrodynamic generating grooves of the hydrodynamic bearing type rotary device.

For example, the first thrust hydrodynamic generating grooves 3A are formed in a spiral pattern as shown in FIG. 2. The second thrust hydrodynamic generating grooves 3B may employ a herringbone pattern as shown in FIG. 3, for example. However, as necessary, a pattern in a direction flowing the lubricant 5 from the outer circumference to the inner circumference may be employed so that a force for transferring the lubricant 5 to the thrust hydrodynamic generating grooves 3B is increased, and oil film rupture (lubricant film rupture) is prevented. Alternatively, a spiral pattern may be used for flowing the lubricant toward the inner circumference, or an asymmetrical herringbone pattern may be used for flowing the lubricant toward the inner circumference. The hydrodynamic generating grooves 1B of the radial bearing hole 1A are formed in a symmetrical herringbone pattern. However, as necessary, asymmetrical pattern in a direction for flowing the lubricant 5 from the hub 7 side toward the flange 3 may be employed. By employing such a pattern, a force for transferring the lubricant 5 toward the hydrodynamic generating grooves 1B is increased and oil film rupture can be prevented.

Figure 4A:
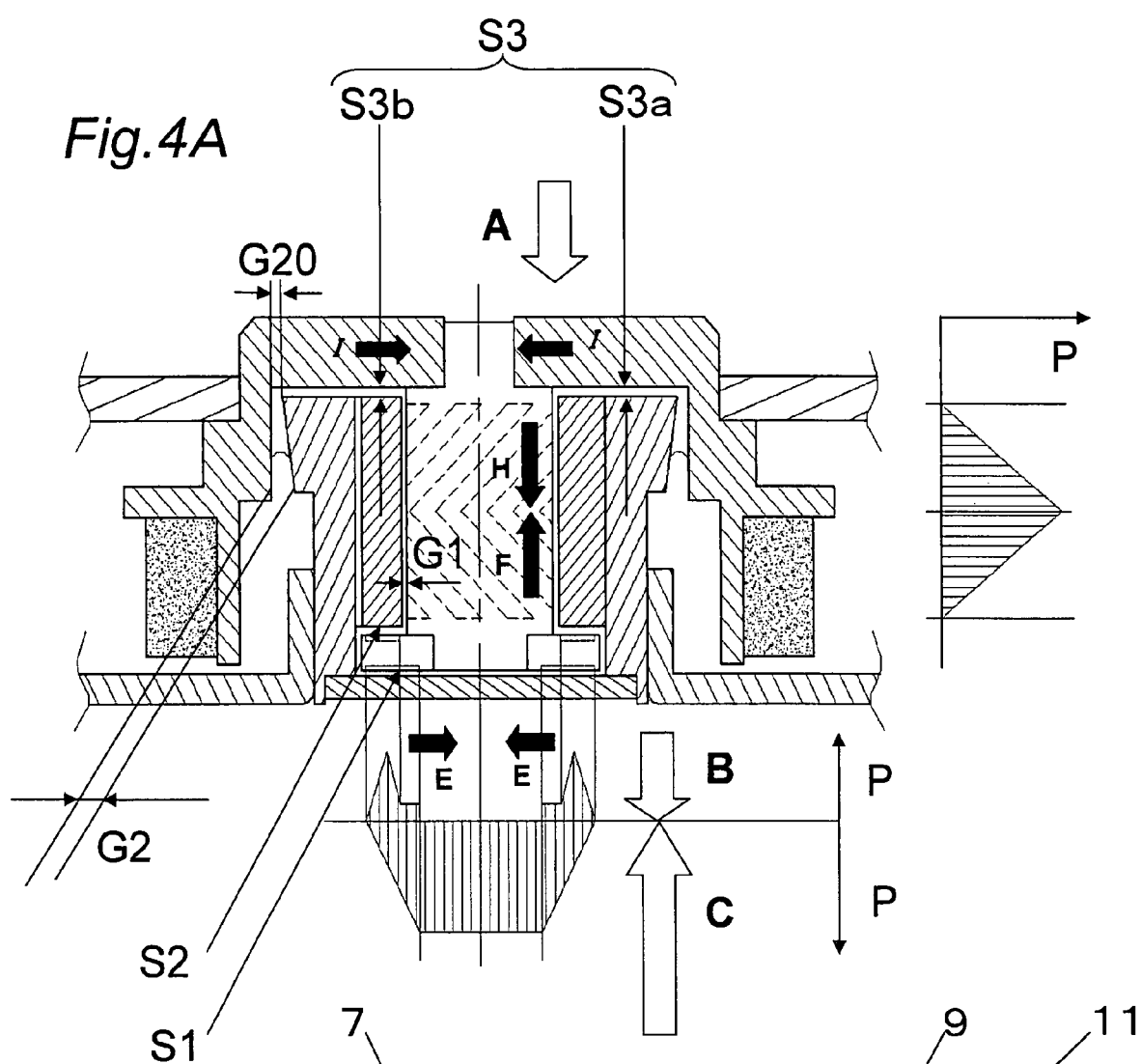
FIG. 4A is a detailed diagram of the hydrodynamic bearing type rotary device.
Figure 4B:
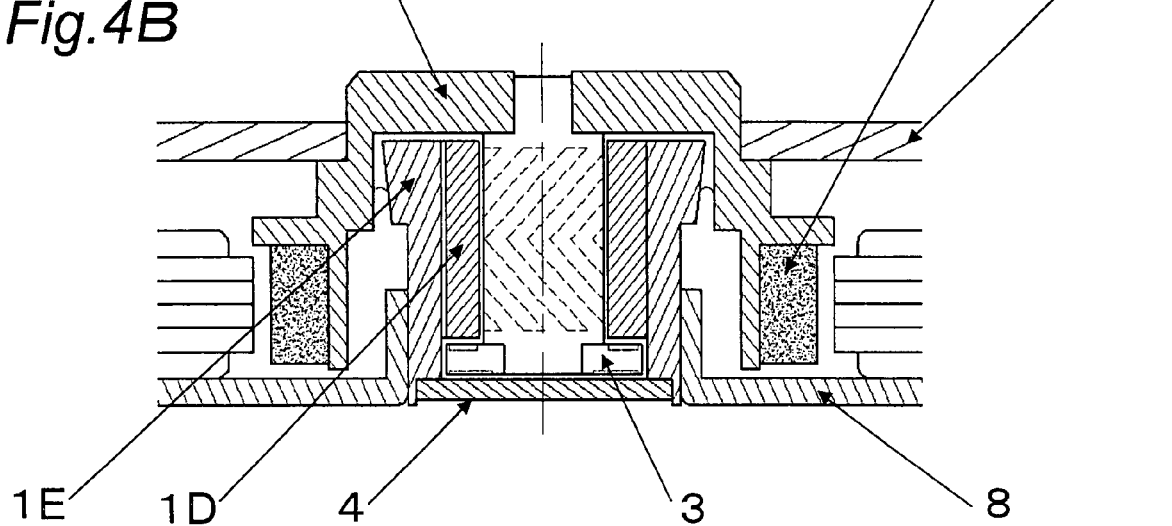
FIG. 4B is an enlarged view thereof.

As shown in FIGS. 4A and 4B, in the hydrodynamic bearing type rotary device of the present embodiment, the first gap S1 between the thrust plate 4 and the flange 3, the second gap S2 between the flange 3 and the lower end surface of the sleeve 1, the gap G1 of the bearing hole 1A of the sleeve 1, and the third gap S3 between the upper end surface of the sleeve 1 and the hub 7 satisfy the following relational expression (1) given that the third gap S3 is the smaller one of the gap S3a and the gap S3b.

$$S3 > (S1 + S2) \qquad (1)$$

In this way, the third gap S3 can always be secured irrespective of the position where the flange 3 rotates in the gap between the sleeve 1 and the thrust plate 4. Thus, a certain amount of the lubricant 5 can always be kept in the third gap S3. Since the first and the second gaps S1 and S2 on both surfaces of the flange 3, i.e., thrust bearing portions, are always narrower than the third gap S3, a capillary force at the first and the second gaps S1 and S2 becomes stronger than that at the third gap S3. As a result, the lubricant 5 can be securely kept on the both surfaces of the flange 3, and a sufficient angular stiffness can be obtained even with a small outer diameter of the thrust bearing portions. Thus, rotational friction loss at the thrust bearing portion can be significantly reduced.

Figure 5:
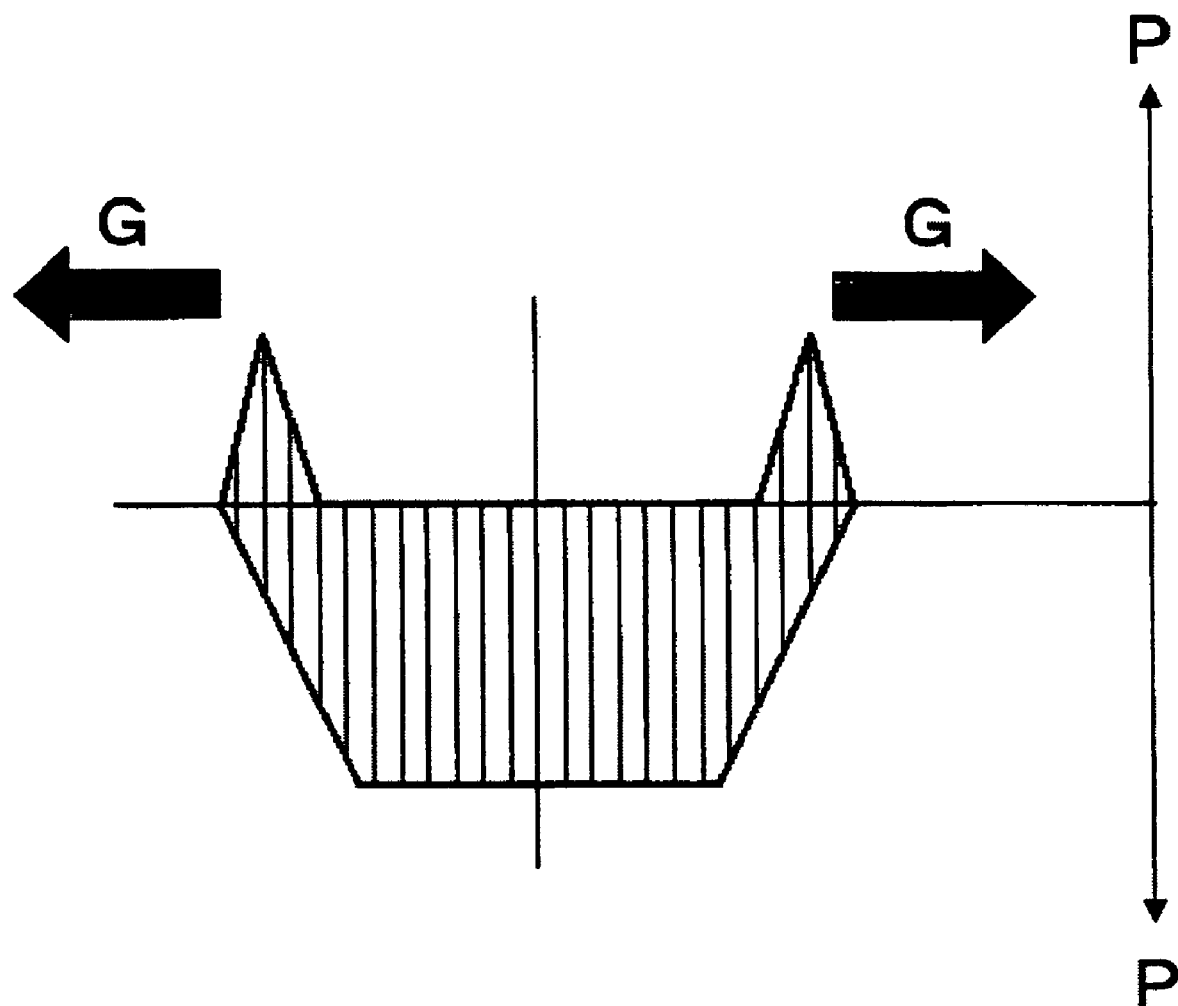
FIG. 5 is a diagram showing pressures at thrust bearing portions of the hydrodynamic bearing type rotary device.

As shown in FIGS. 4A, 4B, and 5, in the radial hydrodynamic generating grooves 1B, a pressure indicated by P in the right-hand side of FIG. 4A is generated. As shown in FIG. 4A, in the first thrust hydrodynamic generating grooves 3A, a pressure indicated by P in a lower part is generated and a supporting force indicated by arrow C in the figure is generated. In the second thrust hydrodynamic generating grooves 3B, a pressure is also generated, and a supporting force indicated by arrow B is generated. Further, a force of the rotor magnet 9 which pulls the stator 10 downward in the axial direction as shown in FIG. 1A is applied in a direction of arrow A in FIG. 4A. The floating height and a position of rotation of the flange 3 are automatically determined so as to satisfy the following relationship:

Force in direction $A$+force in direction $B$=force in direction $C$.

However, according to the present embodiment, a load of arrow A can be made sufficiently small. This is because the pressure of the second thrust bearing (supporting force B) has the same strength as that of the attraction force of the rotor magnet 9.

Figure 11:
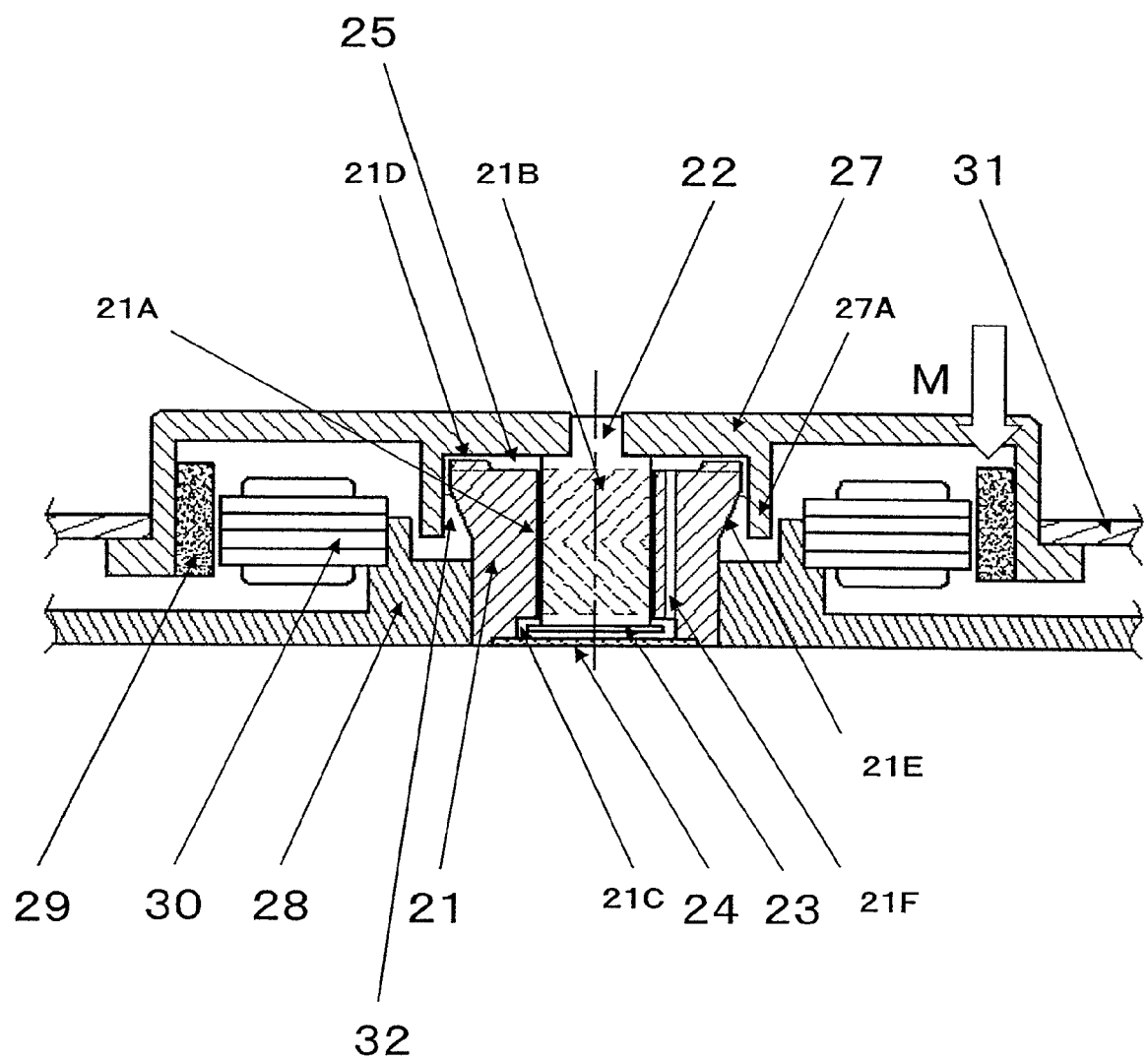
FIG. 11 is a cross-sectional view of a conventional hydrodynamic bearing type rotary device.
Figure 12:
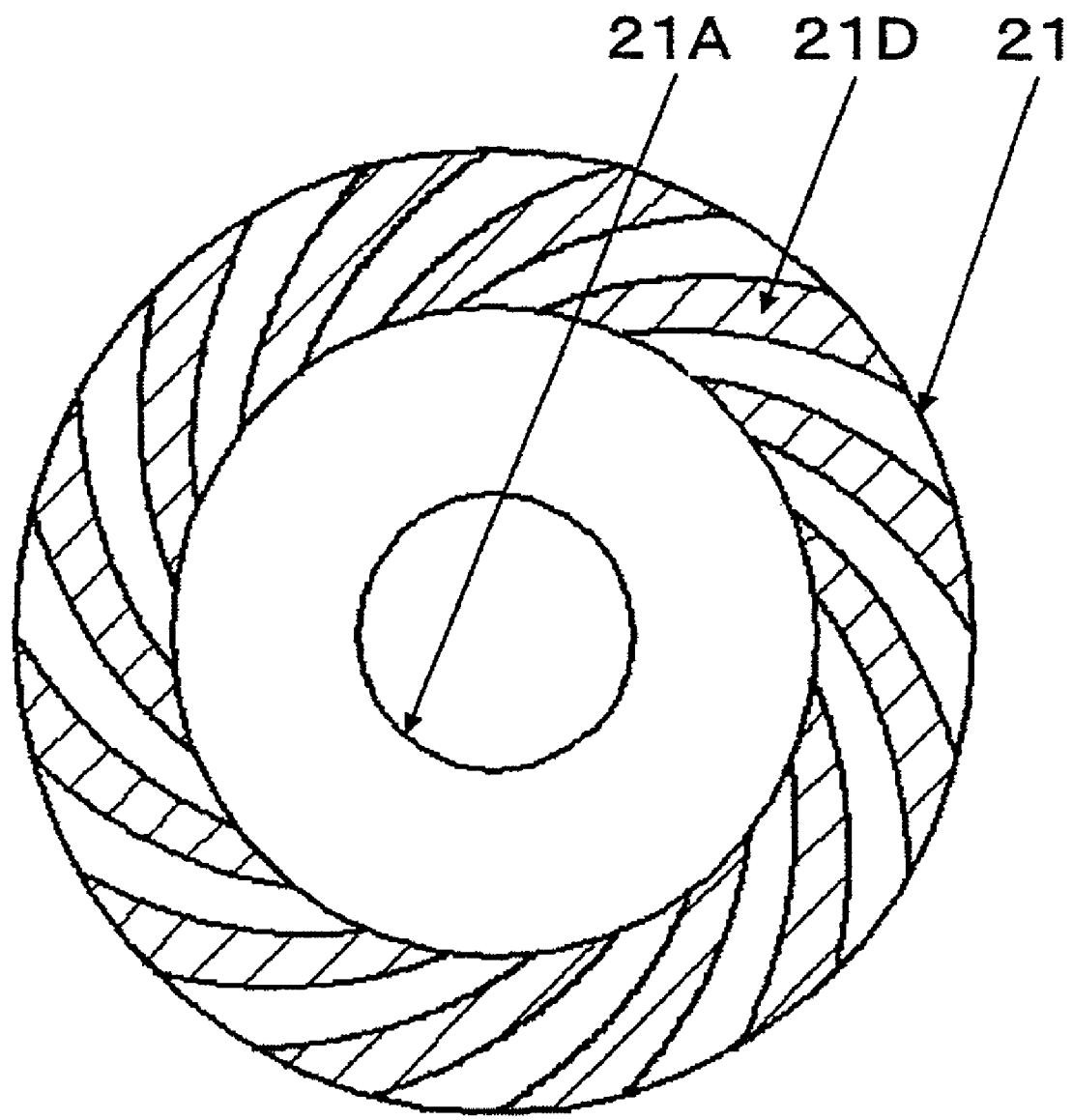
FIG. 12 is a detailed diagram showing thrust hydrodynamic generating grooves of the hydrodynamic bearing type rotary device.

The force in the direction of arrow A is 15 grams or higher in the conventional example shown in FIG. 11. In the present embodiment, the force is about 2 to 3 grams. Thus, as the bearing starts to rotate, the shaft quickly floats by the force of the first thrust hydrodynamic generating grooves 3A. Thus, rubbing and abrasion at the bearing portions when operation starts or stops can be reduced compared to those in the conventional example.

The radial hydrodynamic generating grooves 1B and the first thrust hydrodynamic generating grooves 3A vary in their dimensions. When, for example, the second thrust hydrodynamic generating grooves 3A generate a pumping pressure which flow the lubricant 5 from the outer circumference toward the inner circumference as indicated by arrow E in FIG. 4A, the lubricant 5 is transported in a direction of arrow F in FIG. 4A. As a result, the lubricant 5 flows from the third gap through the communication hole 1C to the second gap, is supplied to a radial bearing surface, and returns to the third gap, forming a loop. The lubricant 5 circulates to cool the bearing surface, and discharges minute bubbles of air eluted from the lubricant 5 from the bearing surface toward the third gap. No hydrodynamic generating groove is formed in a direction toward the inner circumference in the third gap unlike the conventional example. Thus, the exhausted air can be readily discharged from the seal portion 6.

When the hydrodynamic generating grooves 1B of the radial bearing surface have asymmetrical groove pattern such that the oil is transported in a direction indicated by arrow H in FIG. 4A, the lubricant 5 is supplied to the radial bearing surface from the third gap. The lubricant 5 flows through the second gap and the communication hole 1C and returns to the third gap, forming a loop in the opposite direction. Alternatively, when a pumping pressure which flows the lubricant 5 from the inner circumference toward the outer circumference as indicated by arrow G in FIG. 5 is generated at the second thrust hydrodynamic generating grooves 3A, the lubricant 5 also circulates along the loop in the opposite direction. Even in this case, no hydrodynamic generating groove is formed in a direction toward the inner circumference in the third gap unlike the conventional example. Thus, the exhausted air can be readily discharged from the seal portion 6. The direction of the flow of the lubricant 5 in the loop does not make a big difference and either direction can be used.

Figure 6:
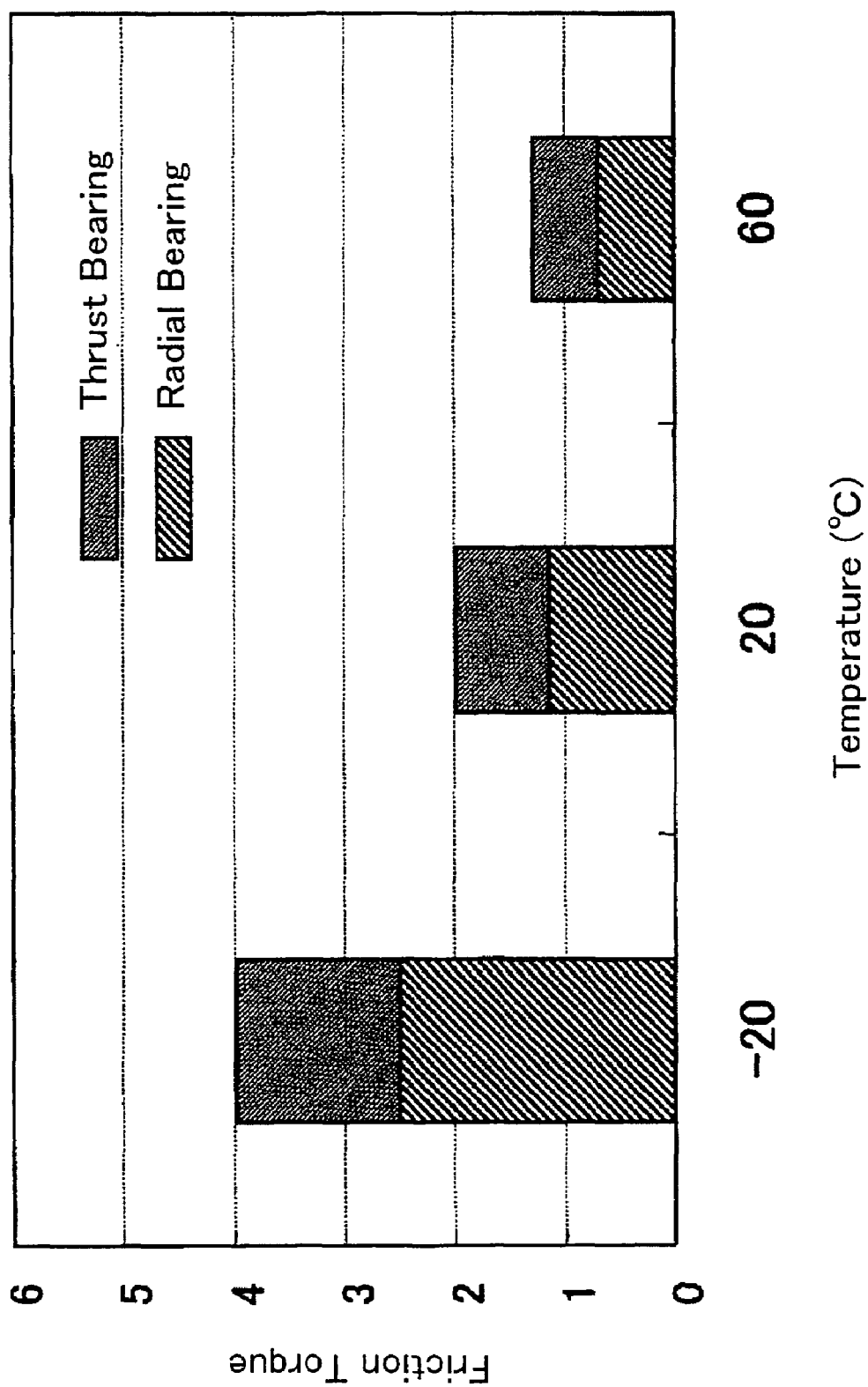
FIG. 6 is a diagram illustrating a proportion of friction torques of the hydrodynamic bearing type rotary device.
Figure 13:
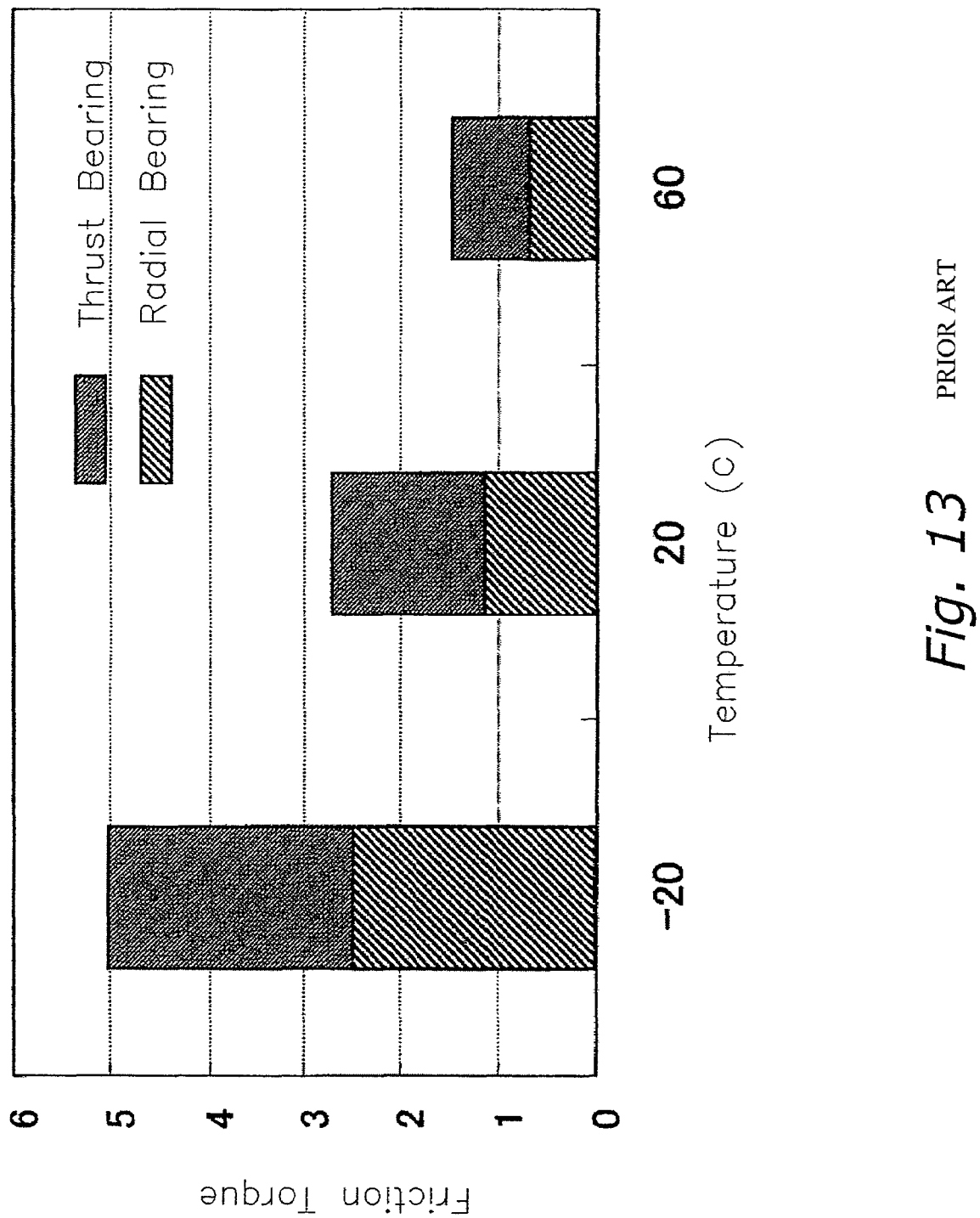
FIG. 13 is a diagram illustrating a proportion of friction torques of the hydrodynamic bearing type rotary device.

FIG. 6 shows a relationship of the magnitudes of friction torques of the hydrodynamic bearing type rotary device of the present embodiment. Compared with FIG. 13 which shows the relationship in the conventional hydrodynamic bearing type rotary device, it is shown that the friction torques of the radial bearings are almost the same as those of the conventional example. Meanwhile, the thrust bearing portions generate strong angular stiffness by pressures at the thrust hydrodynamic generating grooves 3A and 3B on both surfaces of the flange 3 (the angular stiffness is a proportion of the force which brings it back in position from the displaced angle to its original one when the shaft is tilted). Thus, the diameter of the flange 3 and diameters of two sets of thrust hydrodynamic generating grooves 3A and 3B can be sufficiently small to reduce the friction torque, and the power consumption of the motor can be suppressed.

Figure 7:
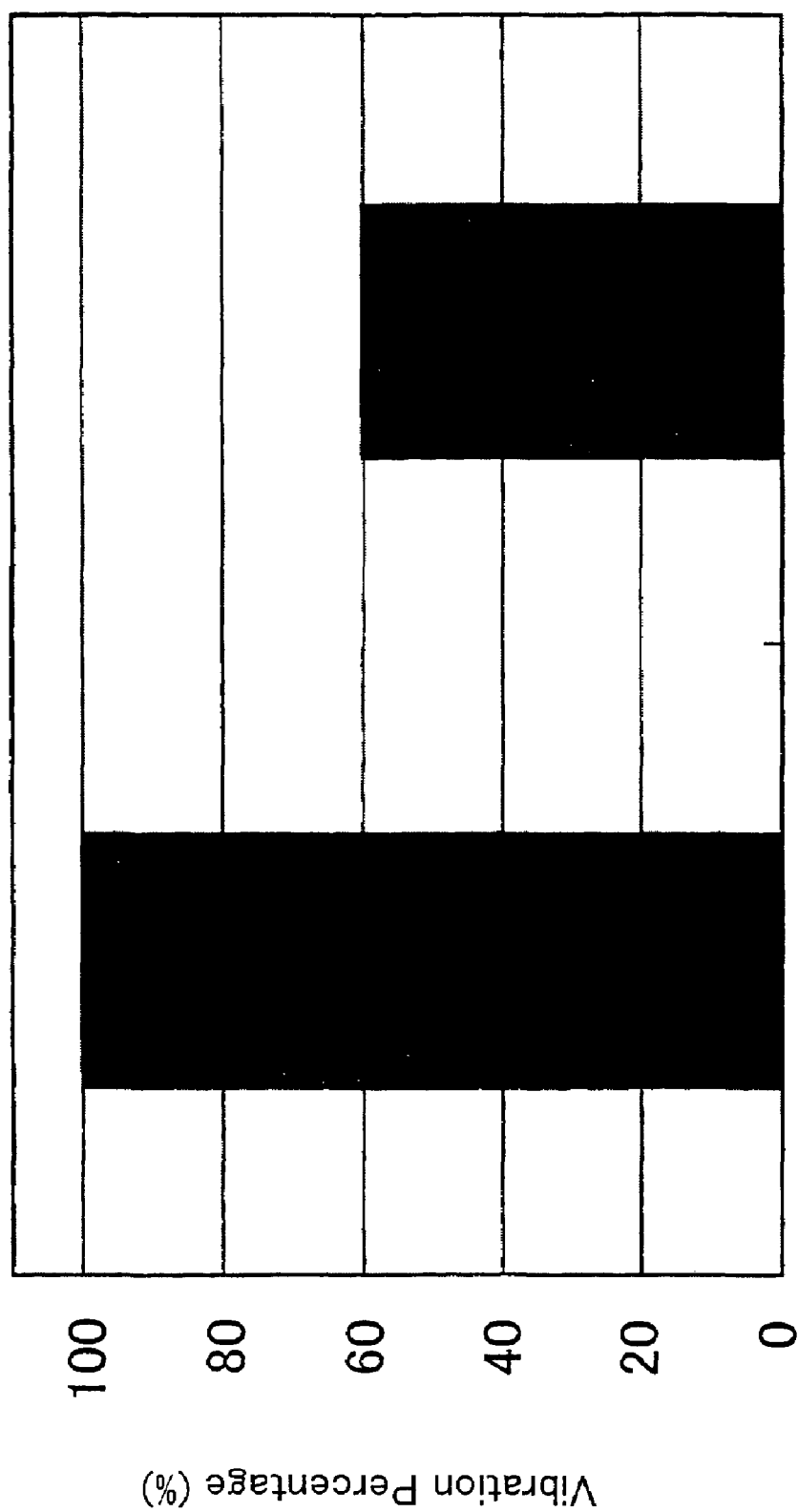
FIG. 7 is a diagram illustrating a vibration percentage of the hydrodynamic bearing type rotary device.

FIG. 7 shows a comparison of vibration percentage of the motor with that of the conventional example. In the present embodiment, the force of the rotor magnet 9 (FIG. 1A) attracting the stator 10 in the axial direction is about 2 to 3 grams, and is sufficiently small. The attraction force and its variance may be a source of vibration of the entire motor and may have adverse effect on the motor performance. Since the source of the vibration of the hydrodynamic bearing type rotary device of the present embodiment is small, the motor can be rotated with less vibration and less noise.

Figure 8:
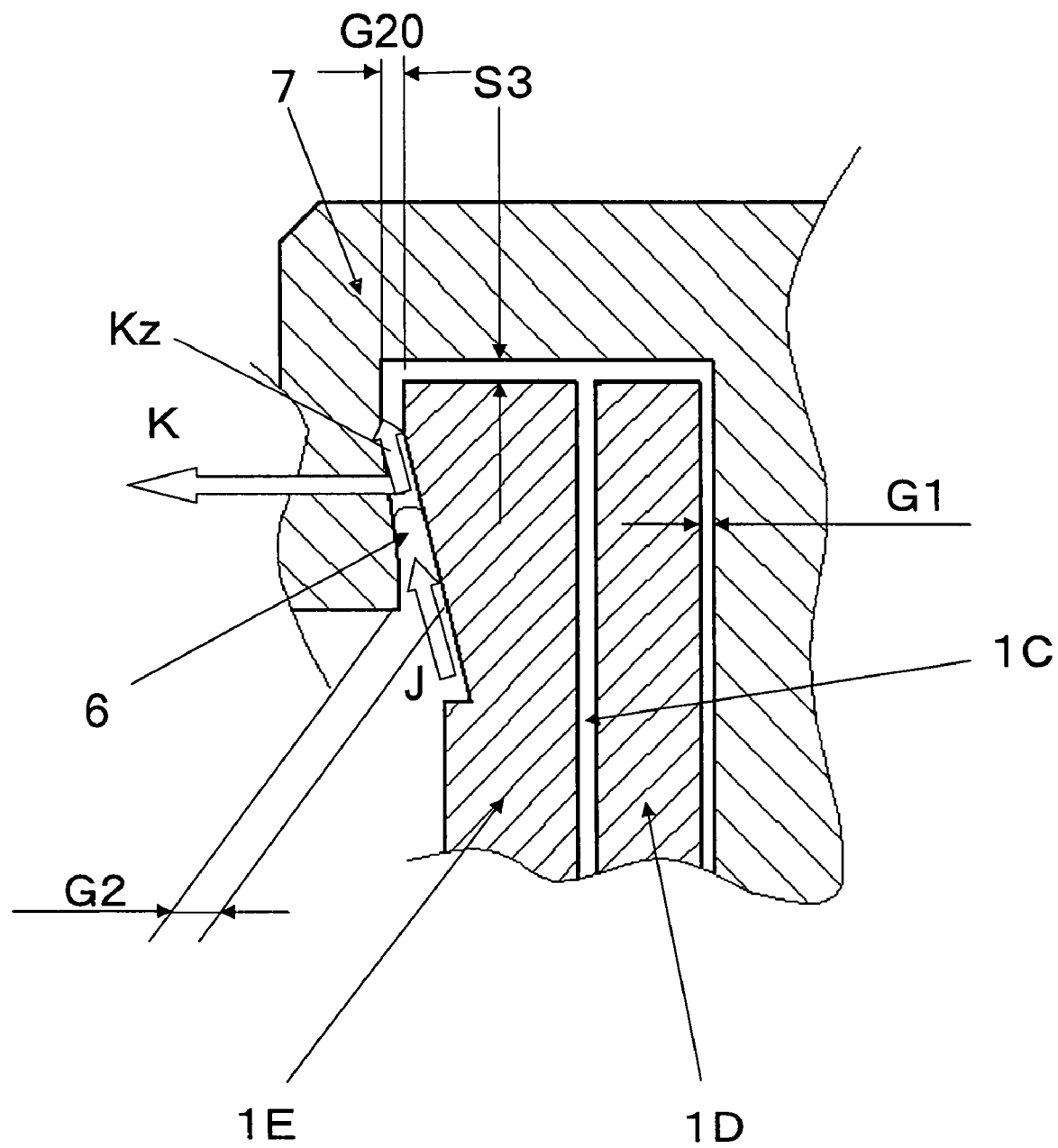
FIG. 8 is a detailed diagram showing a sealing portion of the hydrodynamic bearing type rotary device.
Figure 9:
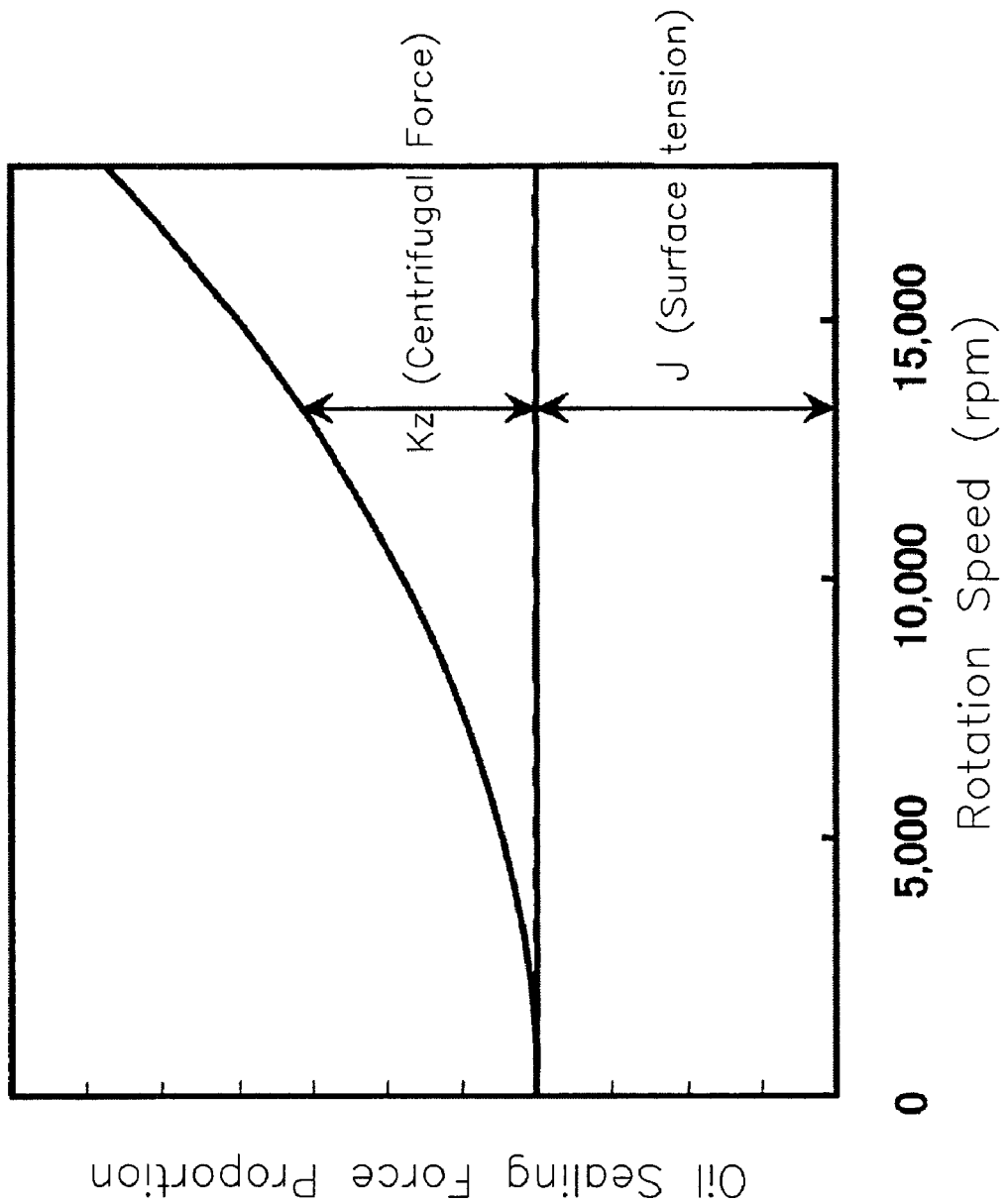
FIG. 9 is a diagram illustrating a proportion of oil sealing force of the hydrodynamic bearing type rotary device.

With reference to FIGS. 8 and 9, a gap of the seal portion 6 has its maximum gap G2 (fifth gap) between an outer peripheral surface of the sleeve 1 and an inner peripheral surface of a hub which has a shape substantially like a cup. The hub has a diameter slightly larger than that of the outer peripheral surface, and a disc receiving surface to which a disc can be loaded. The minimum width (G20) of the gap of the seal portion 6 is almost the same as that of the gap S3 at its minimum part. However, the width of the maximum part is about 800 μm. A surface is tapered so that the width of the gap varies. In this way, a surface tension of the oil is utilized to keep the lubricant 5 in the bearing cavity. The relationships of the gap G1 of the radial bearing surface of the bearing hole 1A (fourth gap), the third gap S3, the maximum gap G2 of the seal portion 6 are designed to satisfy the following relational expression (2).

$$G2 > S3 > G1 \quad (2)$$

Since the lubricant 5 tends to move toward the smaller gap due to the surface tension, the oil sealing effect can be obtained.

Furthermore, when the minimum width G20 is designed so that the following relational expression (3) may be satisfied, it is more preferable.

$$G20 > S3 \quad (3)$$

Furthermore, since the evacuated air (bubble) moves in an opposite direction to the oil, it can be readily discharged from the seal portion 6 to the outside. FIG. 9 shows two forces: a component force (Kz) of centrifugal force (K) applied to the lubricant 5 in the seal portion 6 which seals the oil; and oil sealing force (J) from the above-mentioned surface tension at different rotation speeds of the bearings. The surface tension (J) does not depend upon the rotation speed and shows the constant value. On the other hand, the component force (Kz) of the centrifugal force (K) gradually increases depending upon the rotation speed. Since the oil sealing force is the sum of these two forces (J+Kz), the oil sealing force increases, and the oil becomes less likely to leak. If the inner diameter dimension of the inner peripheral surface of the hub 7 does not become larger toward the gap S3 as it does not in the example shown in FIG. 8, when the centrifugal force (K) is acting on the lubricant 5, the component force (Kz) thereof acts in a direction to run off the oil. The oil sealing force in such a situation is a difference of these two forces (J−Kz). However, if the rotation speed is about 10,000 rpm or lower, the value of the difference (J−Kz) is sufficient amount and the oil does not flow out.

In the present embodiment, the sleeve 1 is formed of pure iron, stainless steel, copper alloy or the like. And the sleeve 1 is a metal rod machined by a lathe or the like, and the communication hole 1C is machined by a drill or the like. The shaft 2 is formed of stainless steel or the like. The diameter thereof is 2 to 5 mm. As the lubricant 5, ester oil with low viscosity is used. The lubricant is not limited to this example, but may be fluorine oils, ionic liquids, or the like.

The first gap S1 is 5 μm, the second gap S2 is 10 to 100 μm, the third gap S3 is 50 to 200 μm, and the gap G1 of the radial bearing surface (the fourth gap) is 1to 5 μm.

In the third gap provided between the hub 7 and the sleeve 1 (the side of the inner sleeve 1D), spiral grooves or the like may be machined on the lower surface of the hub 7 by lathing process or the like. Such grooves allow the lubricant 5 to readily flow in. For this purpose, it is desirable that the oil circulates in a direction indicated as I in FIG. 4A.

Figure 10:
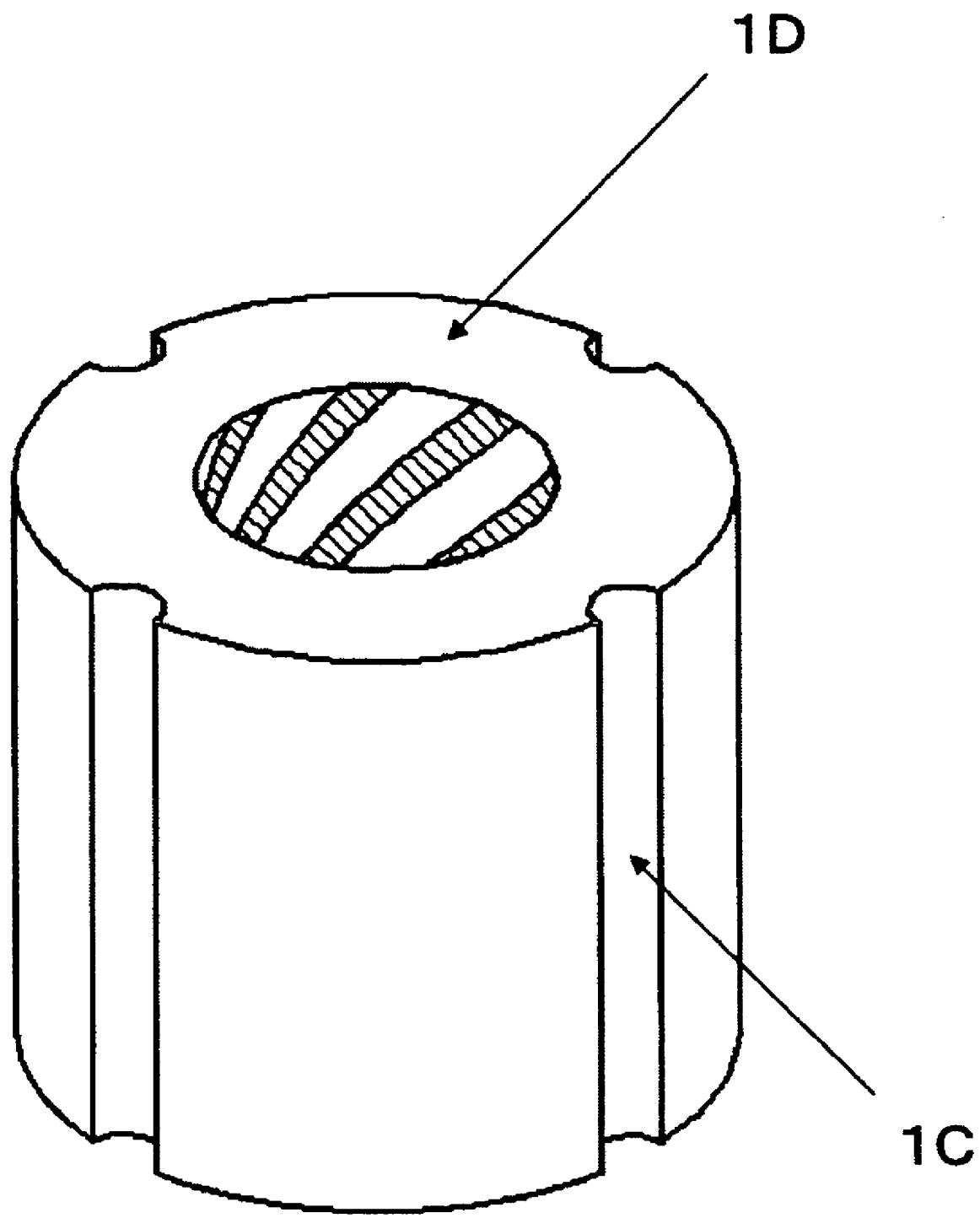
FIG. 10 is a diagram illustrating a sintered sleeve of the hydrodynamic bearing type rotary device.

The inner sleeve 1D is good also as a sintered sleeve including iron or copper as a main component as shown in FIG. 10. The density of sintering is 90% or higher. In this example, the communication path 1C may be vertical grooves (communication grooves), and molded using a die (not shown) Pores on the surfaces are sealed by providing a triiron tetroxide film, or treating with electroless nickel plating. By having the sintered density of 90% or higher, the leakage of hydrodynamic pressure from the bearing surface can be prevented. It is confirmed that, with the sintered density not higher than this value, the lubricant leaks from the bearing surface toward into the base material of the sintered sleeve, and hydrodynamic pressure is reduced. Thus, the stiffness of bearing cannot be achieved.

Herein, the sintered density refers to a density obtained as follows. A density is calculated from the weight of the sintered body and a volume measured based on Archimedes' principle with pores on the surfaces of the sintered body being sealed with wax or the like. The density obtained in this way is divided by a true density of only usual components of the sintered body to obtain the sintered.

By providing a triiron tetroxide film or treating with electroless nickel plating on a surface thereof, anti-abrasion property and anti-rust property can be achieved. Thus, a hydrodynamic bearing type rotary device with high reliability which can be used for a long term can be achieved.

By virtue of combined effects of providing the circulation passage and designing each gaps to satisfy the relational expression, S3>(S1+S2), as mentioned above, the oil is filled in smaller bearing gap (S1 and S2) by the surface tension of the oil. Meanwhile, it becomes possible that air and bubbles trapped in the bearing cavity smoothly expel out of the bearing and move to the larger gap (S3) by the flow of circulation. As a result, there is no oil film rupture in the bearing gaps, and the bearing gaps can be filled with the oil completely. In the conventional bearing designing, a surface area of the bearing and bearing spans are designed to be large with sufficient margins to allow for oil film rupture. In the present invention, long-term reliability can be achieved even it is designed with less margin. Thus, the present invention is useful in miniature hydrodynamic bearings having small thickness.

In the hydrodynamic bearing type rotary device of the present embodiment having the above-described structure, the circulation passage for the oil 5 is provided in a space between the hub 7 and the sleeve 1, thereby realizing a thin the hydrodynamic bearing type rotary device. By providing two sets of hydrodynamic bearings formed on gaps of both the upper and lower surfaces of the flange 3 as the thrust bearings, rotation friction torque can be sufficiently small while the high angular stiffness is being maintained. Moreover, by having the magnetic centers in the axial direction and in the radial direction of the rotor magnet 9 and the stator 10 are substantially aligned to suppress an amount of the magnetic attraction force, the rotary vibration or changes in the rotation speed caused by a variance in magnetization of the rotor magnet 9 can be reduced. By combining these features, an optimal hydrodynamic bearing type rotary device can be obtained because of effects of these features.

Other Embodiments (A)

In the above embodiment, the hydrodynamic bearing type rotary device has two thrust bearing portions: first thrust hydrodynamic generating grooves 3A formed on the surface of the flange 3 which opposes the thrust plate 4; and the second thrust hydrodynamic generating grooves 3B formed on the surface of the flange 3 which opposes the sleeve 1. However, the present invention is not limited to such an example.

For example, a hydrodynamic bearing type rotary device may include only one set of the first and the second thrust hydrodynamic generating grooves as a thrust bearing portion which is provided on either the surface of the flange which opposes the thrust plate or the surface of the flange which opposes the sleeve.

However, by forming thrust bearing portions on both sides in the axial direction of the hydrodynamic bearing type rotary device, the hydrodynamic pressure can be balanced in the axial direction at the thrust bearing portions while the rotational resistance is being prevented from increasing. In view of this point, it is preferable to provide the thrust bearing grooves on both sides in the axial direction as in the above embodiment.

(B)

In the above embodiment, as shown in FIG. 4A, the third gap (S3a) formed between the hub 7 and the sleeve collar (outer sleeve 1E) has a width about the same as that of the gap (S3b) between the hub 7 and the sintered sleeve (inner sleeve 1D). However, the present invention is not limited to such an example.

For example, the third gap (S3a) defined by the hub 7 and the sleeve collar does not have to have the width about the same as that of the gap (S3b) between the hub 7 and the sintered sleeve.

(C)

In the above embodiment, structure of the hydrodynamic bearing type rotary device has been described as an example. However, the present invention is not limited to such an example.

Figure 14:
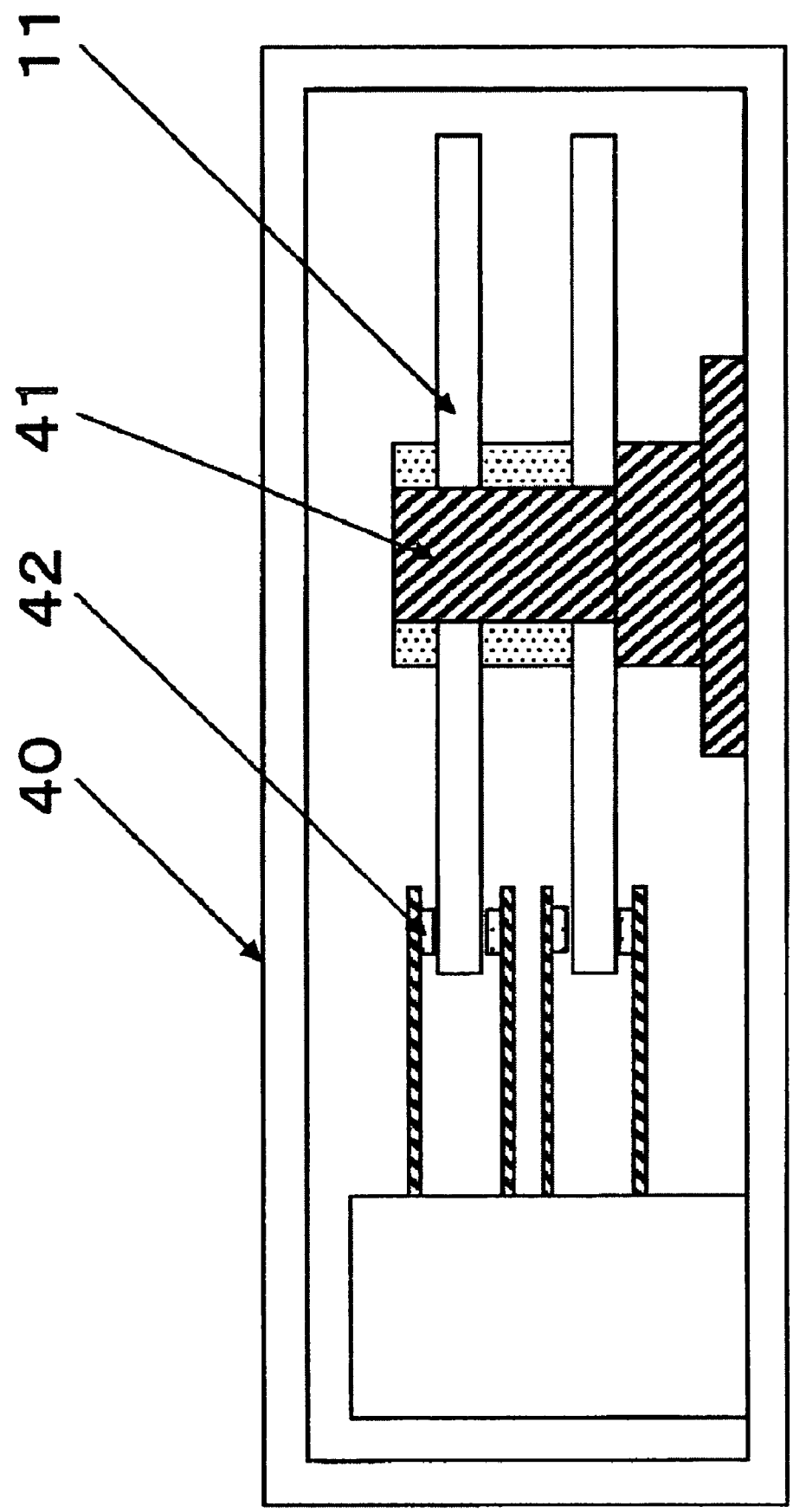
FIG. 14 is a cross-sectional view of a recording and reproducing apparatus including the hydrodynamic bearing type rotary device of the present invention.

For example, as shown in FIG. 14, the hydrodynamic bearing type rotary device described above can be incorporated into a recording and reproducing apparatus. In this way, a recording and reproducing apparatus with a lower rotational friction loss and lower power consumption can be achieved.

(D)

In the above embodiment, as shown in FIGS. 4A and 4B, the gap between the outer sleeve (sleeve cover) 1E and the hub 7 is formed into a tapered-seal shape with the maximum gap G2 to keep the lubricant within the gap. However, the present invention is not limited to such an example.

Figure 15:
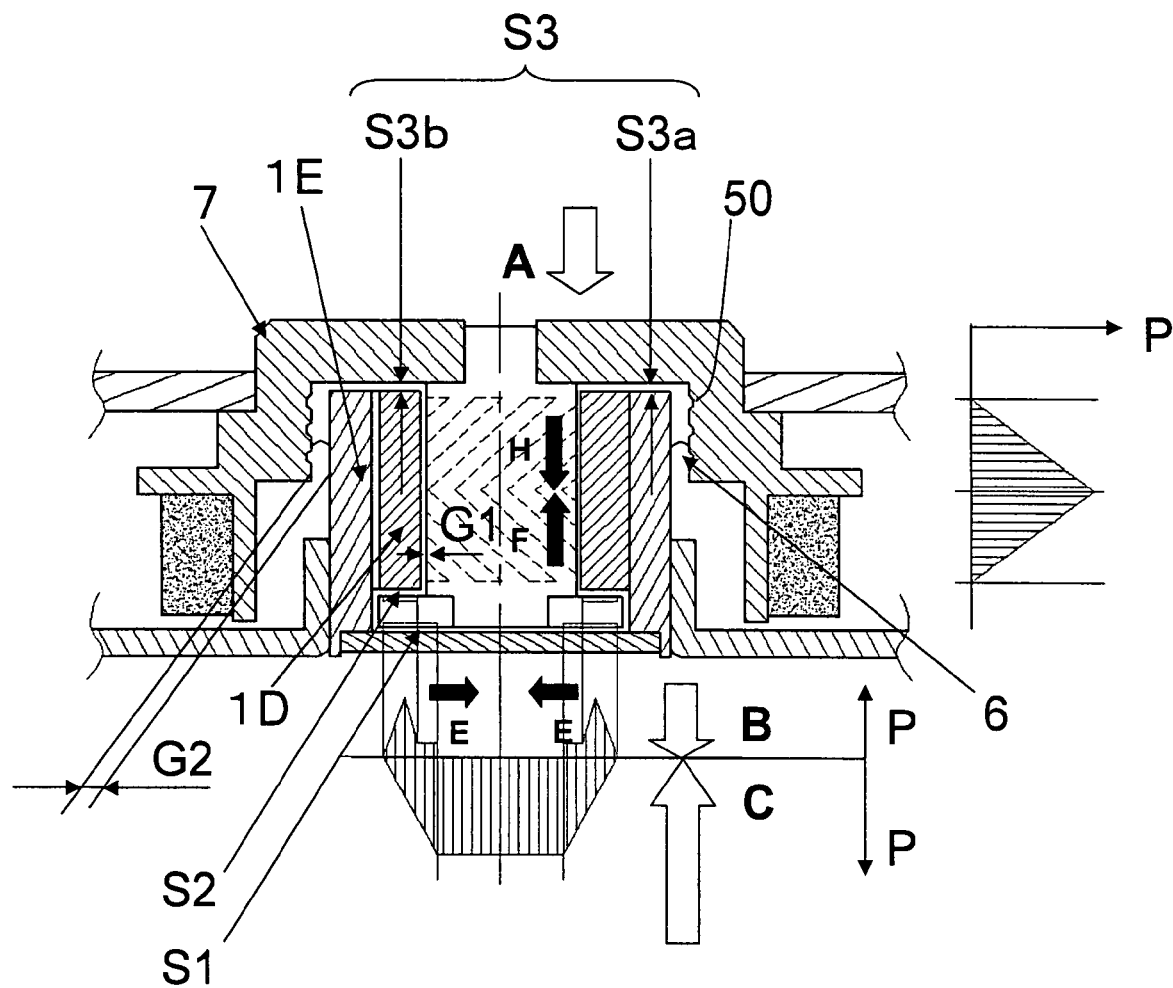
FIG. 15 shows a detailed diagram and enlarged view of the hydrodynamic bearing type rotary device according to another embodiment of the present invention.

For example, as shown in FIG. 15, helical grooves 50 may be formed on the inner peripheral surface of the hub 7 instead of the tapered seal portion to keep the lubricant. Alternatively, the tapered seal portion shown in FIG. 4A, and the helical grooves shown in FIG. 15 may be combined to keep the lubricant.

(E)

In the above embodiment, the hub and the like are formed of one component. However, the present invention is not limited to such an example.

Figure 16:
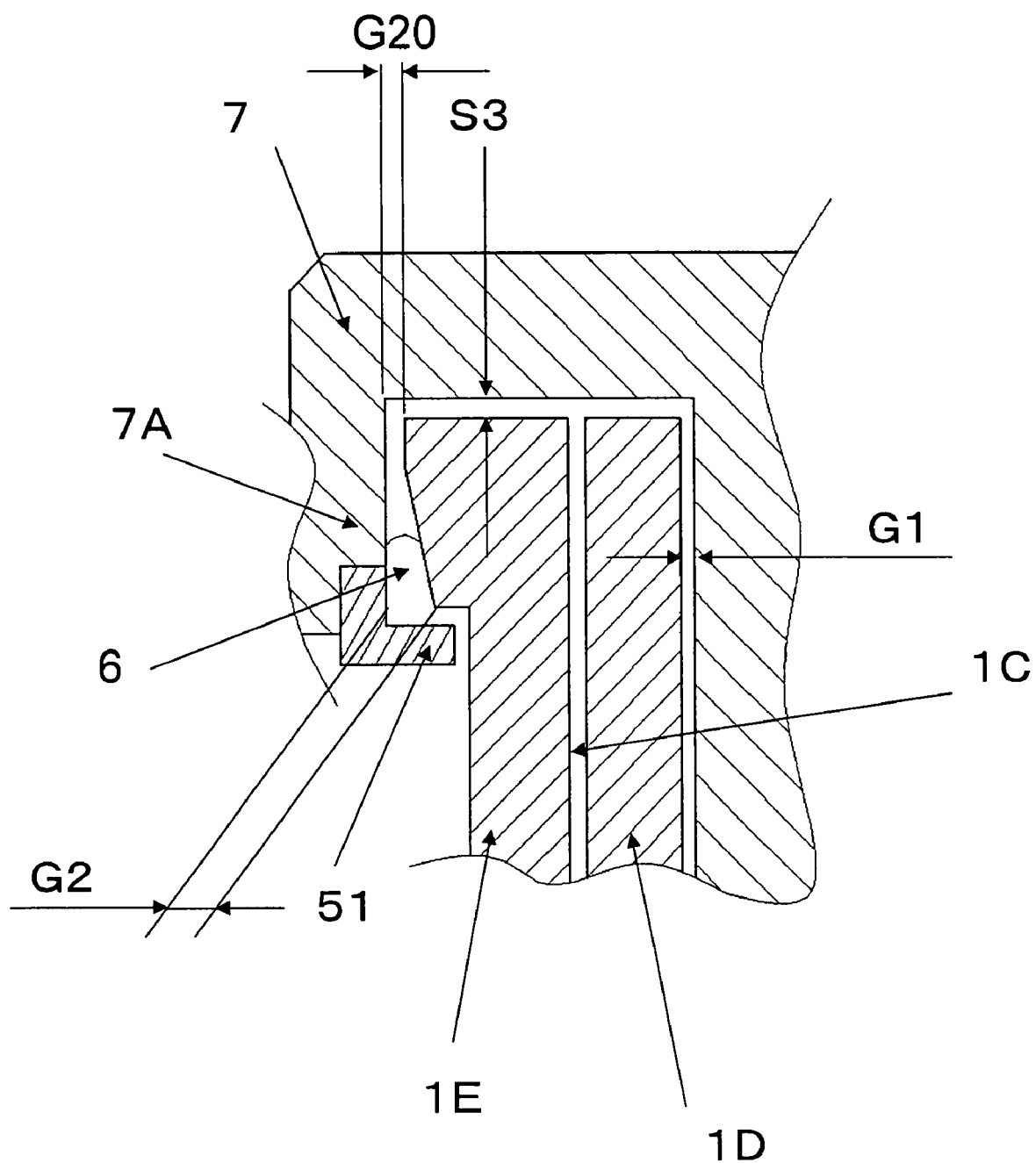
FIG. 16 is an enlarged view of the hydrodynamic bearing type rotary device according to yet another embodiment of the present invention.

For example, as shown in FIG. 16, a seal ring 51 having a cross-section of L-lettered shape may be fixed to a lower end of a hub tubular portion 7A and integrated with the hub by press fitting or the like after the lubricant 5 is injected. With such a structure, an opening of the bearing is wide when the lubricant 5 is injected so the lubricant 5 is less likely to be spilled and sticks outside the bearing while it is being injected. Further, since the gap between the lower end of the seal ring 51 and the outer sleeve 1E in the axial direction becomes small, evaporation of the lubricant 5 can be suppressed and the life of the bearing under a high temperature can be extended. Further, when a large impact force is applied in a direction to disengage the rotor, the hub can support the impact loading together with the flange at the thrust bearing portions. Thus, it becomes possible for the device to withstand a larger shock.

The hub may be formed of a plurality of components having shapes other than the one described above. They do not impair the sprit of the present invention. Other parts can also be deformed without departing from the scope of the present invention.

(F)

In the present embodiment, the lower opening of the communication path is near the second gap S2, and the communication path is parallel to the bearing hole. However, the present invention is not limited to such an example.

Figure 17:
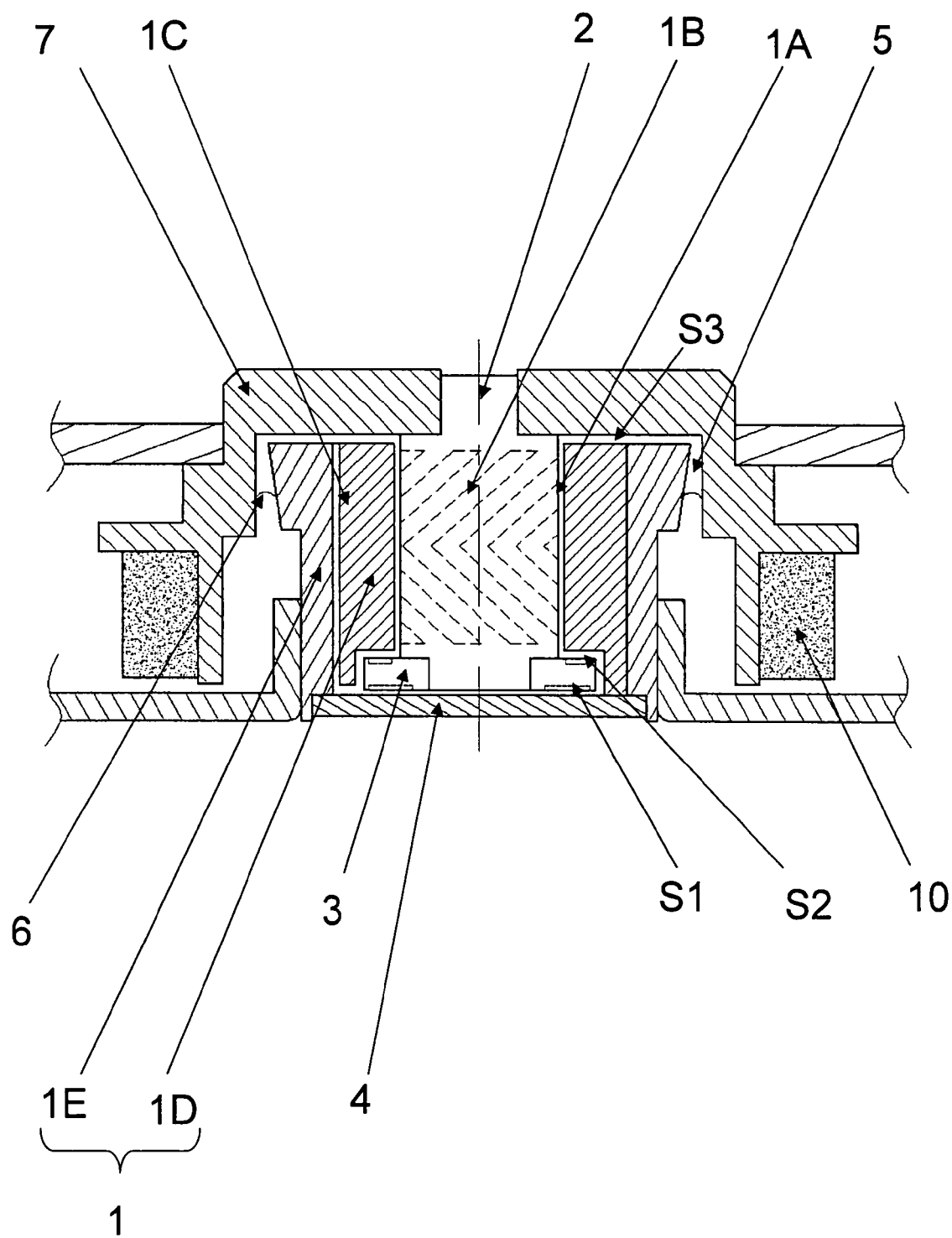
FIG. 17 is a cross-sectional view of the hydrodynamic bearing type rotary device according to still another embodiment of the present invention.

For example, as shown in FIG. 17, the lower opening of the communication path may be provided near the first gap S1. Moreover, the communication path may be unparallel to the bearing hole and instead, may be in a helical pattern, for example. A shape of the communication hole 1C in plan does not have to be an arc shape. Instead, it may be a D-cut shape provided at one or more positions on the outer circumference.

(G)

In the above embodiment, the thrust plate 4 is fixed to the sleeve 1. However, the present invention is not limited to such an example.

For example, the thrust plate may be fixed to the base plate 8.

(H)

In the above embodiment, the sleeve 1 is formed of two members, i.e., the inner sleeve 1D and the outer sleeve 1E. However, the present invention is not limited to such an example.

For example, the sleeve may be formed of one component formed by machining a rod member of copper alloy or a stainless alloy by a lathing process, and may have a communication path provided by drilling.

(I)

In the above embodiment, the rotor magnet 9 is directly fixed to the hub 7. However, the present invention is not limited to such an example.

For example, a main body of the hub may be formed of a non-magnetic material, and then, a circular back yoke made of a magnetic material may be fixed to the hub. A rotor magnet may be fixed to the back yoke.

In the above embodiment, the additional member to the motor is a magnetic disc. However, the present invention is not limited to such an example.

The additional member may be, for example, magnetic discs such as HDDs and FDDs or optical discs such as CD-ROMs, DVDs, MOs and the like, polygon mirrors used for laser scanner/printers or the like, rotary heads used for rotary head devices such as VCRs and the like.

INDUSTRIAL APPLICABILITY

According to the present invention, the rotation property is increased to suppress the friction torque and to reduce the power consumption of the motor. Therefore, the present invention can be widely used as the hydrodynamic bearing type rotary device incorporated not only in recording and reproducing apparatuses such as hard disc drives, optical disc drives, video cassette recorders and the like, but also in information equipment such as laser scanner, laser printers and the like.

The invention claimed is:

1. A hydrodynamic bearing rotary device, comprising:
a sleeve having a bearing hole,
a shaft which is inserted into the bearing hole of the sleeve so as to be relatively rotatable;
a flange forming a substantially disc-like shape which is integrally attached to one end of the shaft;
a hub which is attached to the other end of the shaft and has an additional member receiving surface on which an additional member can be loaded; and
a thrust plate which is placed so as to oppose the flange, wherein
a first gap (S1) between surfaces of the flange and the thrust plate which oppose one another in an axial direction,
a second gap (S2) between surfaces of the flange and the sleeve which oppose one another in the axial direction, and
a third gap (S3) between a surface of the hub and the other end surface of the sleeve which oppose one another in the axial direction are respectively formed,
the hydrodynamic bearing rotary device further comprising a communication path which connects the first gap (S1) or the second gap (S2) and the third gap (S3) and forms a circulation passage to which a lubricant is injected together with the second gap (S2) and the third gap (S3),
in which widths of the first through third gaps (S1 through S3) satisfy the following relational expression (1):

$$S3 > (S1 + S2) \tag{1}$$

2. The hydrodynamic bearing rotary device according to claim 1, wherein thrust hydrodynamic generating grooves are formed on at least one of the thrust plate and the flange surface which opposes the thrust plate.

3. The hydrodynamic bearing rotary device according to claim 1, wherein thrust hydrodynamic generating grooves are formed on at least one of the flange and the sleeve surface which opposes the flange.

4. The hydrodynamic bearing rotary device according to claim 1, comprising:
a fourth gap (G1) with radial hydrodynamic generating grooves formed on at least one of an outer peripheral surface of the shaft and an inner peripheral surface of the sleeve; and
a fifth gap between an outer peripheral surface on the side of the other end surface of the sleeve and an inner peripheral surface of the hub, which has a diameter slightly larger than that of the outer peripheral surface,
wherein a maximum gap G2 of the fifth gap is formed to have a width which satisfies the following relational expression (2):

$$G2 > S3 > G \tag{2}$$

5. The hydrodynamic bearing rotary device according to claim 4, wherein, on the outer peripheral surface of the sleeve which defines the fifth gap, a surface is formed such that the gap becomes narrower toward the third gap.

6. The hydrodynamic bearing rotary device according to claim 4, wherein
a minimum gap G20 of the fifth gap is formed to have a width which satisfies the following relational expression (4):

$$G20 > S3 \tag{4}$$

7. The hydrodynamic bearing rotary device according to claim 1, wherein the hub includes a rotor magnet, a motor stator is attached to a base plate to which the sleeve is fixed, and magnetic centers of the rotor magnet and the motor stator are substantially aligned.

8. The hydrodynamic bearing rotary device according to claim 1, wherein the sleeve includes a sintered sleeve formed of metal sintered material, and a sleeve collar surrounding the outer circumference of the sintered sleeve, and
the communication path is provided between the sintered sleeve and the sleeve collar.

9. The hydrodynamic bearing rotary device according to claim 8, wherein the sintered sleeve includes iron or copper as a main component at a sintered density of 90% or higher, and a surface thereof is provided with a triiron tetroxide film or treated with electroless nickel plating.

10. The hydrodynamic bearing rotary device according to claim 1, wherein the additional member is at least one of a magnetic disc, an optical disc, a polygon mirror, and a rotary head.

11. An information apparatus comprising a hydrodynamic bearing rotary device according to claim 1.

12. A hydrodynamic bearing rotary device, comprising:

a sleeve having a bearing hole, a shaft which is inserted into the bearing hole of the sleeve so as to be rotatable;

a flange having a circular plate shape which is integrally attached to near one end of the shaft;

a hub which is attached to the other end of the shaft and has a disc receiving surface on which a disc can be loaded;

a thrust plate which is placed so as to oppose the flange;

a third gap (S3) between a surface of the hub and one end surface of the sleeve;

a radial bearing formed of a fourth gap (G1) with radial hydrodynamic generating grooves formed on at least one of an outer peripheral surface of the shaft and an inner peripheral surface of the sleeve;

a second gap (S2) between surfaces of the flange and the sleeve which oppose one another in an axial direction; and a first gap (S1) between surfaces of the flange and the thrust plate which oppose one another in the axial direction; wherein first thrust hydrodynamic generating grooves are formed on at least one of the thrust plate and the flange surface which opposes the thrust plate, a communication path is provided to connect the second gap and the third gap, a fifth gap is provided between an outer peripheral surface of the sleeve on the side of the hub and an inner peripheral surface of the hub, which has a diameter slightly larger than that of the outer peripheral surface, the communication path, the second gap, the fourth gap, and the third gap communicate to form a circulation passage;

a lubricant is injected into the circulation passage, a lubricant is also injected into the first gap and the fifth gap, and widths of the first through third gaps are set to satisfy the relation, S3>(S1+S2).

13. A hydrodynamic bearing rotary device, comprising:

a sleeve having a bearing hole, a shaft which is inserted into the bearing hole of the sleeve so as to be relatively rotatable;

a flange forming a substantially disc-like shape which is integrally attached to near one end of the shaft;

a hub which is attached to the other end of the shaft and has an additional member receiving surface on which an additional member can be loaded; and a thrust plate which is placed so as to oppose the flange, wherein a third gap (S3) between a surface of the hub and an end surface of the sleeve which oppose one another, a fourth gap (G1) with radial hydrodynamic generating grooves formed on at least one of an outer peripheral surface of the shaft and an inner peripheral surface of the sleeve, and a fifth gap between an outer peripheral surface on the side of the surface of the sleeve and an inner peripheral surface of the hub, which has a diameter slightly larger than that of the outer peripheral surface, are respectively provided, and a maximum gap G2 of the fifth gap is formed to have a width which satisfies the following relational expression (3):

$$G2 > S3 > G1 \qquad (3).$$

14. The hydrodynamic bearing rotary device according to claim 13, wherein thrust hydrodynamic generating grooves are formed on at least one of the thrust plate and the flange surface which opposes the thrust plate.

15. The hydrodynamic bearing rotary device according to claim 13, wherein thrust hydrodynamic generating grooves are formed on at least one of the flange and a surface of the sleeve which opposes the flange.

16. The hydrodynamic bearing rotary device according to claim 13, wherein, on the outer peripheral surface of the sleeve which defines the fifth gap, a surface is formed such that the gap becomes narrower toward the third gap.

17. The hydrodynamic bearing rotary device according to claim 16, wherein a minimum gap G20 of the fifth gap is formed to have a width which satisfies the following relational expression (5):

$$G20 > S3 \qquad (5).$$

18. The hydrodynamic bearing rotary device according to claim 13, wherein the hub includes a rotor magnet, a motor stator is attached to a base plate to which the sleeve is fixed, and magnetic centers of the rotor magnet and the motor stator are substantially aligned.

19. The hydrodynamic bearing rotary device according to claim 13, wherein the sleeve includes a sintered sleeve formed of metal sintered material, and a sleeve collar surrounding the outer circumference of the sintered sleeve, and the communication path is provided between the sintered sleeve and the sleeve collar.

20. The hydrodynamic bearing rotary device according to claim 19, wherein the sintered sleeve includes iron or copper as a main component at a sintered density of 90% or higher, and a surface thereof is provided with a triiron tetroxide film or treated with electroless nickel plating.

21. The hydrodynamic bearing rotary device according to claim 13, wherein the additional member is at least one of a magnetic disc, an optical disc, a polygon mirror, and a rotary head.

22. An information apparatus comprising a hydrodynamic bearing type rotary device according to claim 13.

* * * * *

UNITED STATES PATENT AND TRADEMARK OFFICE
CERTIFICATE OF CORRECTION

PATENT NO. : 7,674,043 B2  Page 1 of 1
APPLICATION NO. : 11/723316
DATED : March 9, 2010
INVENTOR(S) : Takafumi Asada et al.

It is certified that error appears in the above-identified patent and that said Letters Patent is hereby corrected as shown below:

In column 16, claim 22, line 52, "bearing type rotary" should read --bearing rotary--.

Signed and Sealed this

Sixth Day of July, 2010

David J. Kappos
*Director of the United States Patent and Trademark Office*